US007751639B1

(12) United States Patent
Finlayson et al.

(10) Patent No.: US 7,751,639 B1
(45) Date of Patent: Jul. 6, 2010

(54) OBTAINING INTRINSIC IMAGES

(75) Inventors: Graham Finlayson, Norwich (GB);
Mark S. Drew, West Vancouver (CA);
Cheng Lu, Burnaby (CA)

(73) Assignee: University of East Anglia (GB)

( * ) Notice: Subject to any disclaimer, the term of this patent is extended or adjusted under 35 U.S.C. 154(b) by 1361 days.

(21) Appl. No.: 11/110,518

(22) Filed: Apr. 20, 2005

(51) Int. Cl.
*G06K 9/40* (2006.01)
*G06K 9/00* (2006.01)
*G09G 5/10* (2006.01)
(52) U.S. Cl. .................. 382/254; 382/100; 382/168; 382/260; 345/690
(58) Field of Classification Search .................. 382/254
See application file for complete search history.

(56) References Cited

U.S. PATENT DOCUMENTS 7,359,552 B2 * 4/2008 Porikli ....................... 382/190

FOREIGN PATENT DOCUMENTS

WO  WO 01/52557 A1  7/2001

OTHER PUBLICATIONS

Chen, "Intrinsic Images by Entropy Minimization (Initial Presentation)", 2004 Image Processing Presentation Course, Laboratory for Engineering Man/Machine Systems, Brown University.*
Finlayson et al., "Color constancy at a pixel", J. Opt. Soc. Am. A, 18(2):253-264, Feb. 2001.*
Finlayson et al., "4-sensor camera calibration for image representation invariant to shading, shadows, lighting, and specularities", ICCV'01: International Conference on Computer Vision, pp. II: 473-480. IEEE, 2001.*
Finlayson et al., "Removing shadows from images", ECCV 2002: European Conference on Computer Vision, pp. 4:823-836, 2002.*
Finlayson et al., "Intrinsic Images by Entropy Minimization", May 2004: European Conference on Computer Vision, Prague, pp. 582-595.*
Drew et al., "Recovery of Chromaticity Image Free from Shadows via Illumination Invariance", International Conference on Computer Vision, 2003, Workshop on Color and Photometric Methods in Computer Vision, Nice, France, pp. 32-39.*
Siala et al., "Moving Shadow Detection with Support Vector Domain Description in the Color Ratios Space", International Conference on Pattern Recognition, Aug. 23-26, 2004, vol. 4, pp. 384-387.*
Weiss, "Deriving Intrinsic Images from Image Sequences", Proceedings of the 8th Conference on Computer Vision, 2001, vol. 2, pp. 68-75.*
Barnard et al., "Shadow Identification Using Colour Ratios", Proceedings of the IS&T/SID 8th Color Imaging Conference: Color Science, Systems and Applications, 2000, pp. 97-101.*

* cited by examiner

*Primary Examiner*—Bhavesh M Mehta
*Assistant Examiner*—Jose M Torres
(74) *Attorney, Agent, or Firm*—Craig A. Fieschko, Esq.; DeWitt Ross & Stevens S.C.

(57) ABSTRACT

In a method for the recovery of an invariant image from a 3-band colour image, information relating to the angle for an "invariant direction" in a log-chromaticity space is obtained on the basis that the correction projection is that which minimizes entropy in the resulting invariant image. The method is applied to remove shadows from unsourced imagery.

11 Claims, 40 Drawing Sheets

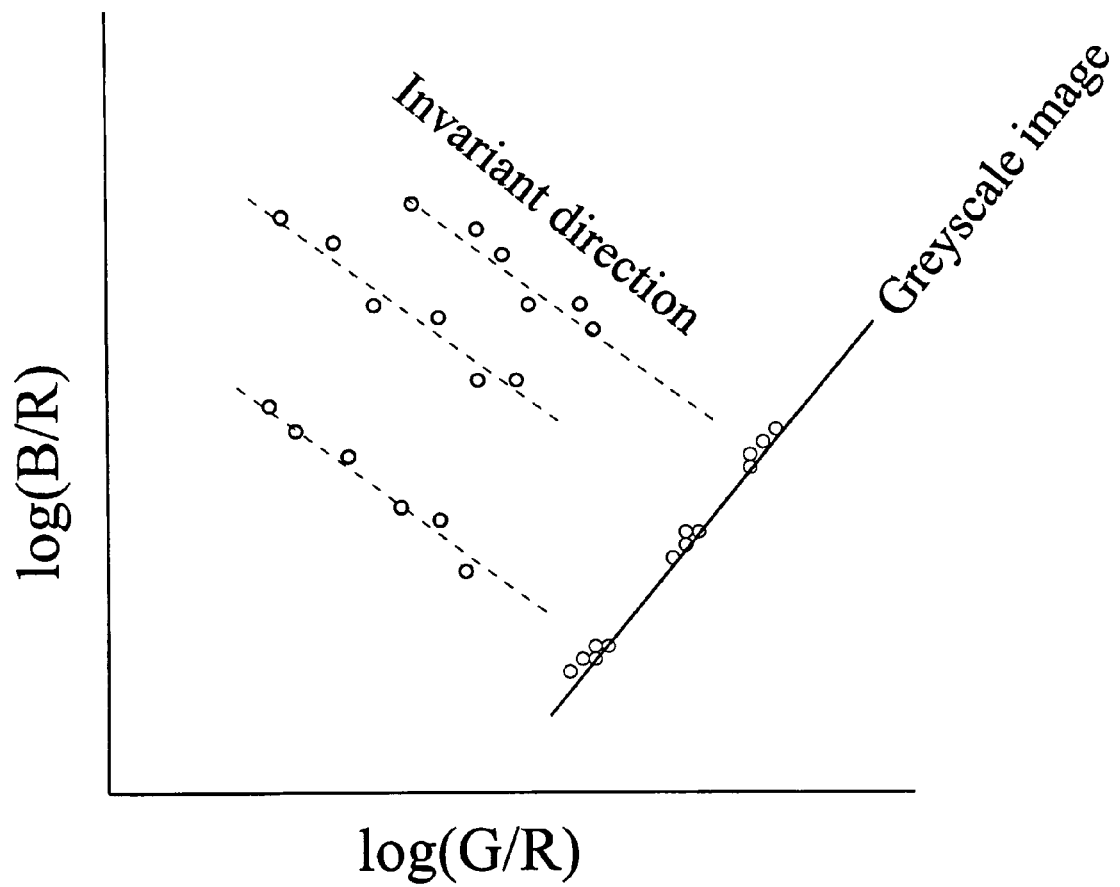
Figure 1: (a)

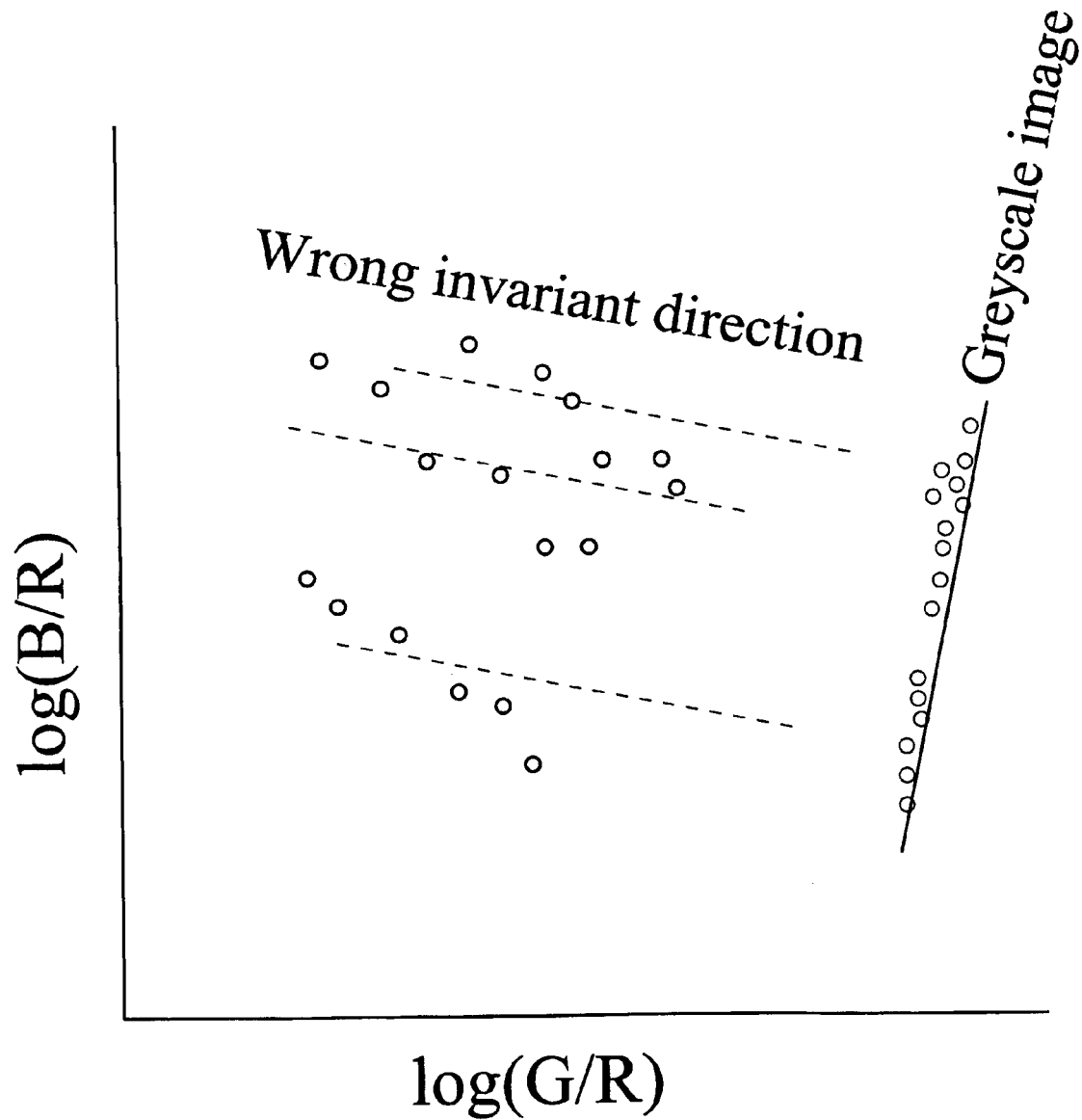
Figure 1: (b)

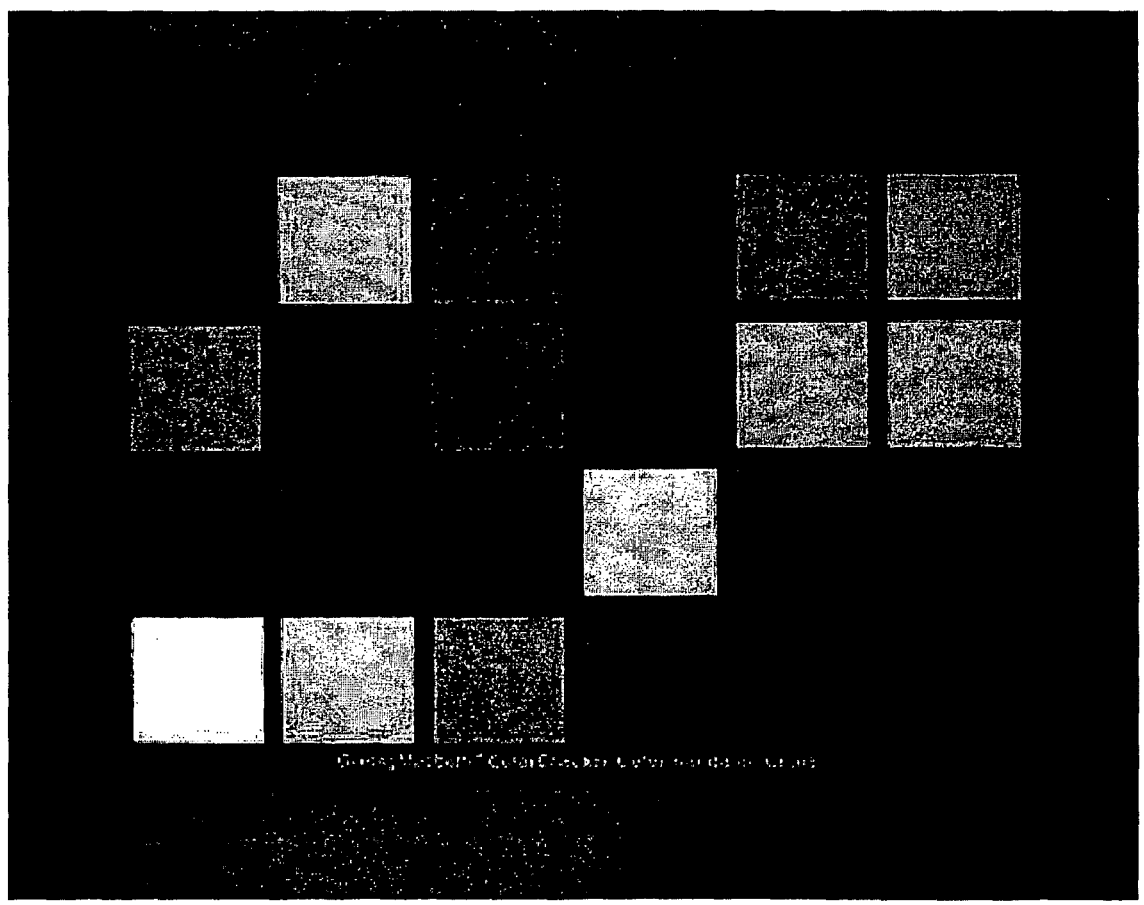
Figure 2: (a)

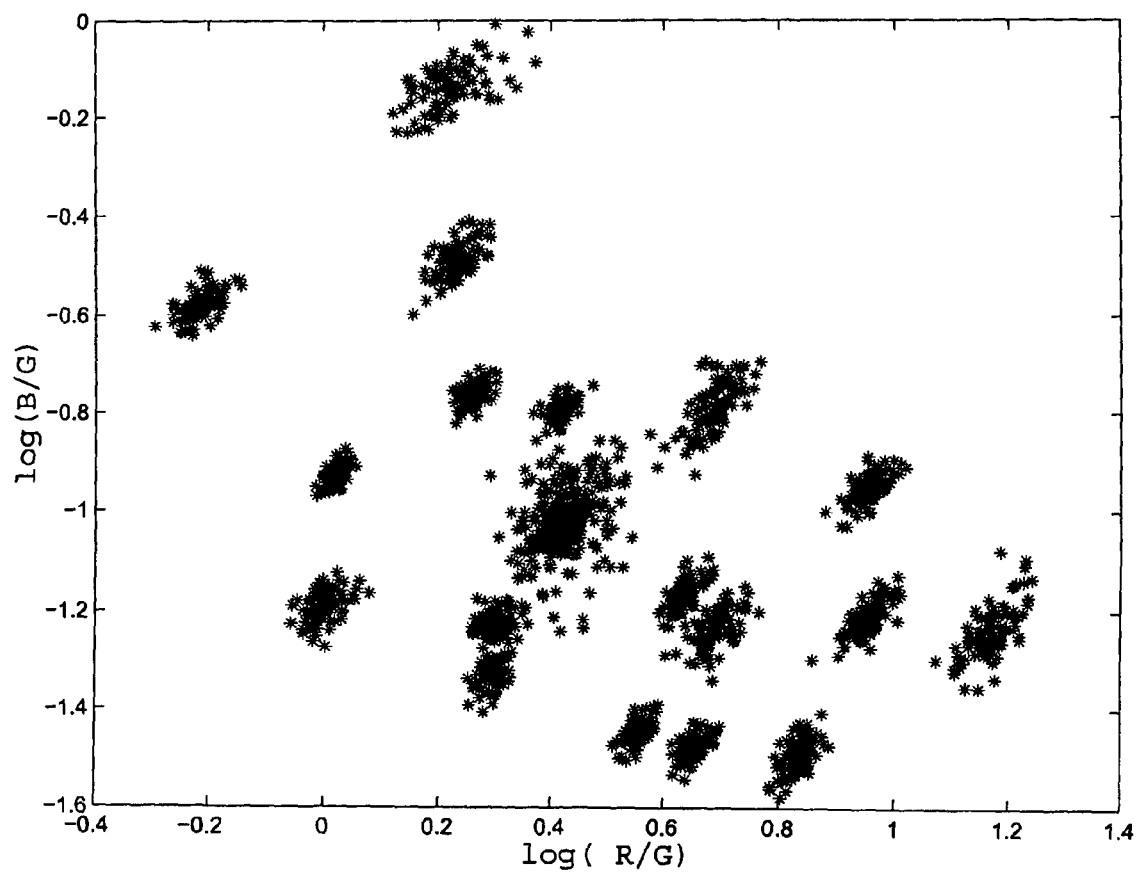
Figure 2: (b)

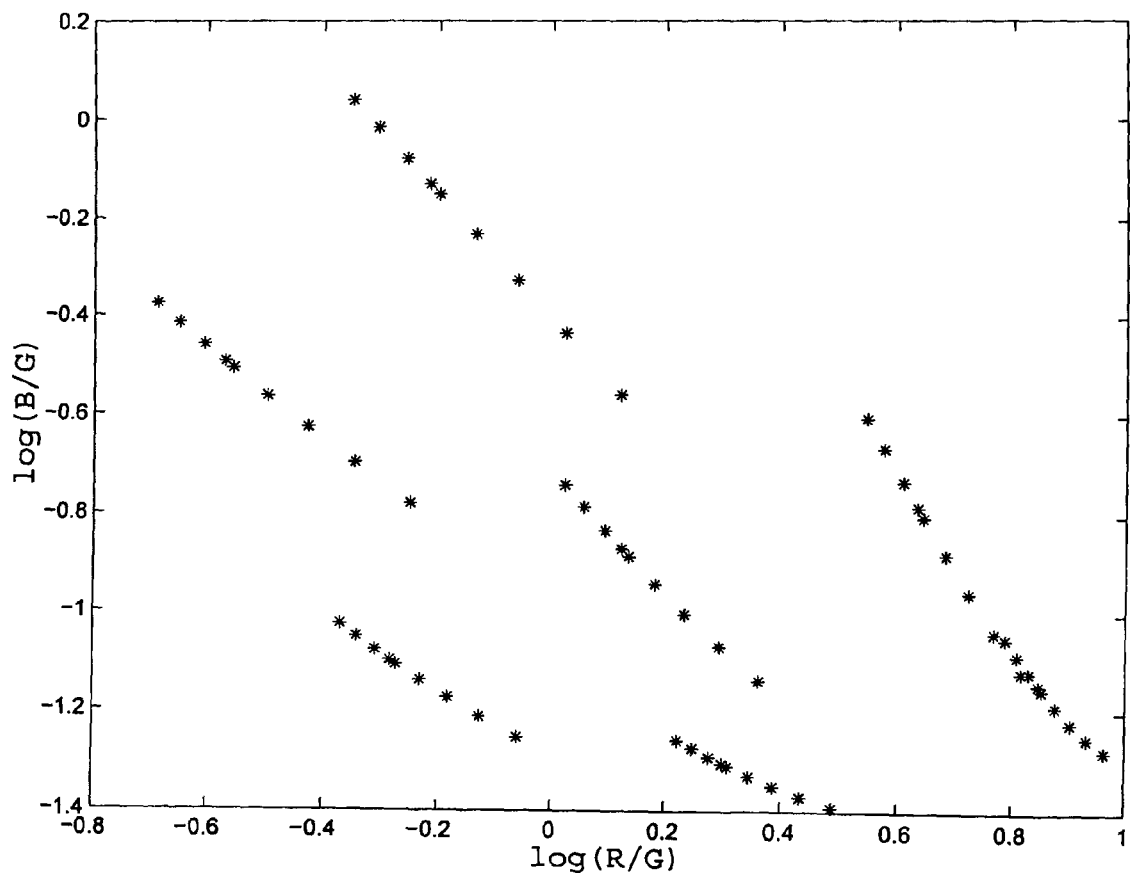
Figure 2: (c)

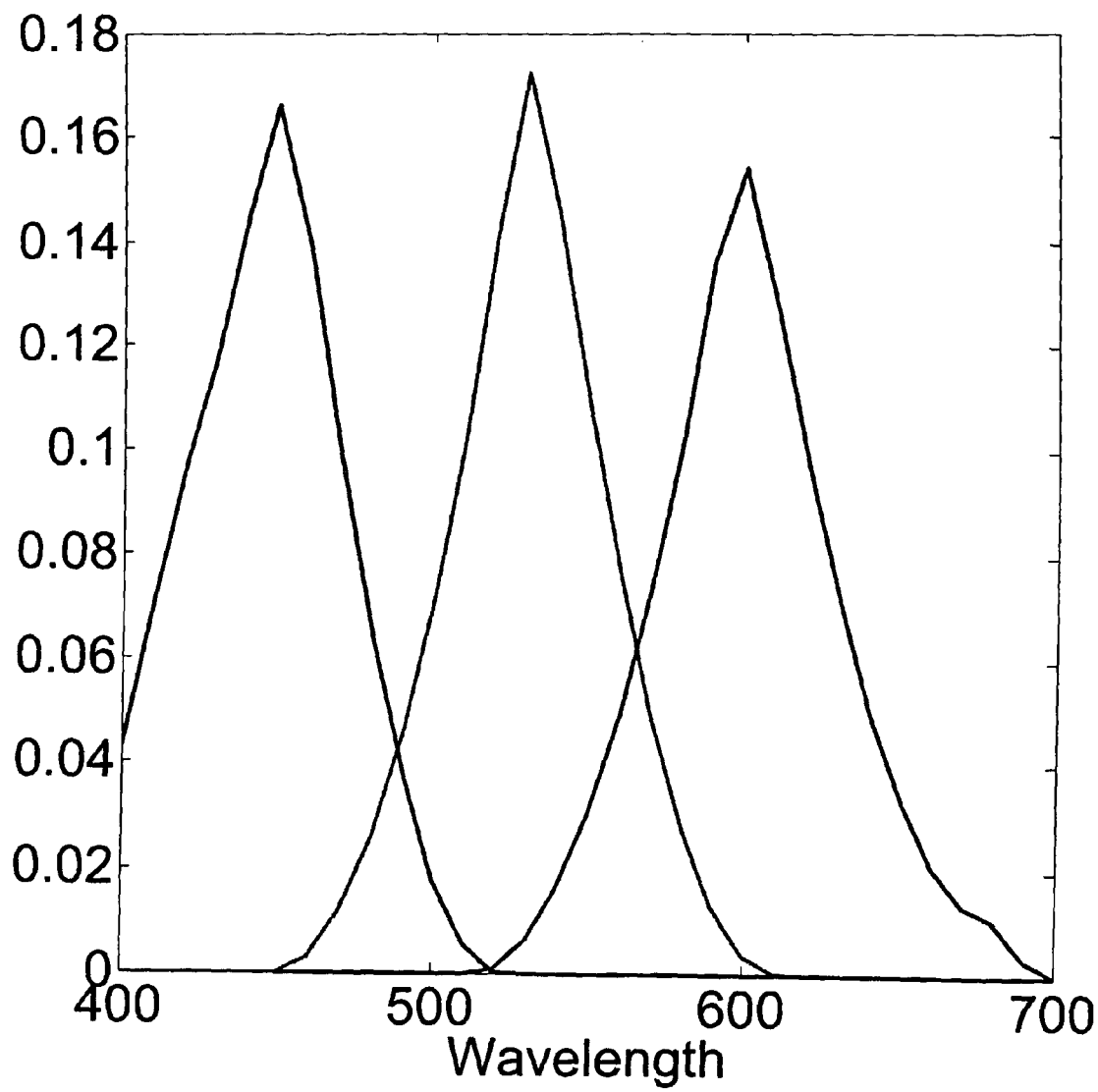
Figure 3: (a)

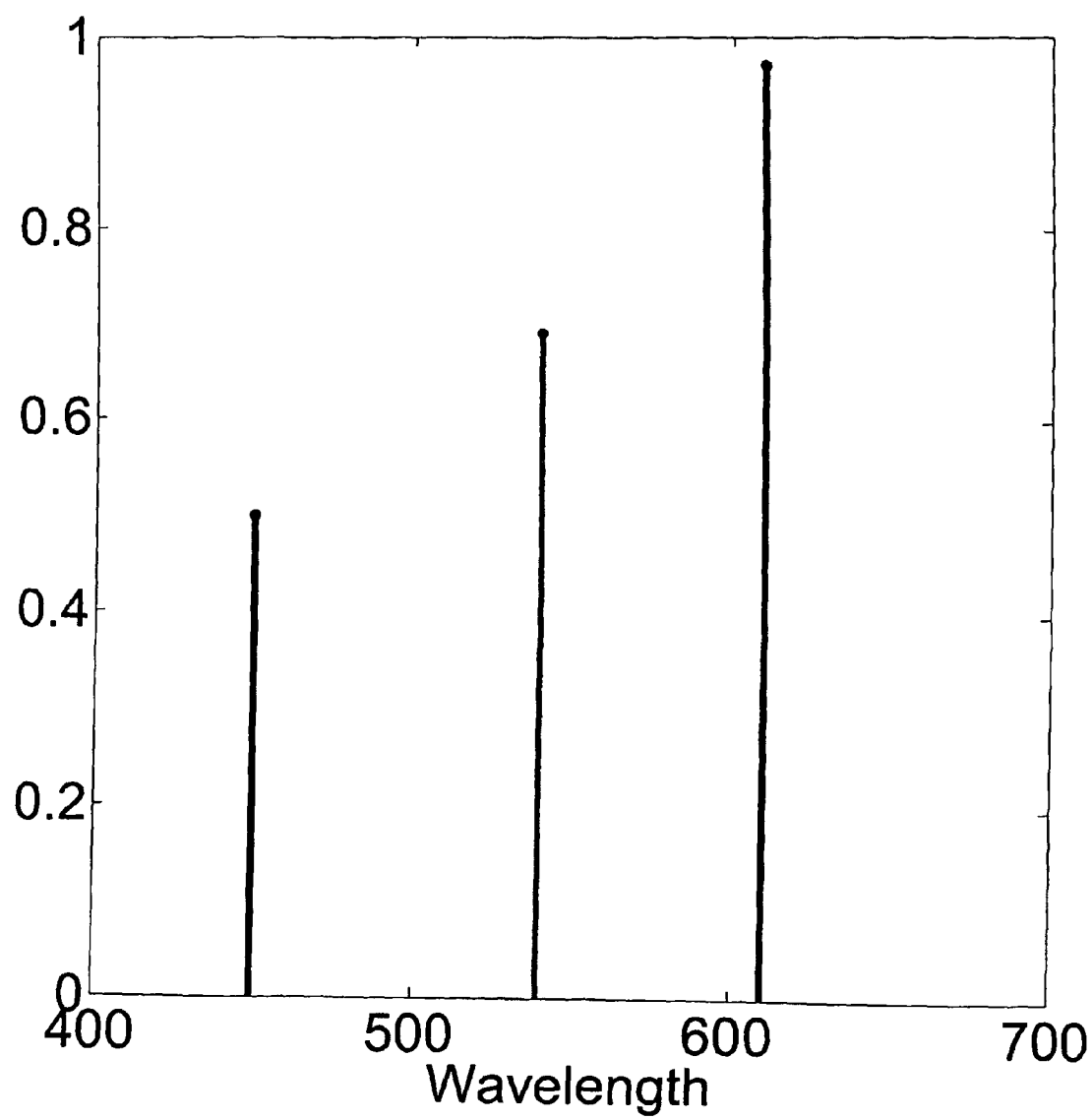
Figure 3: (b)

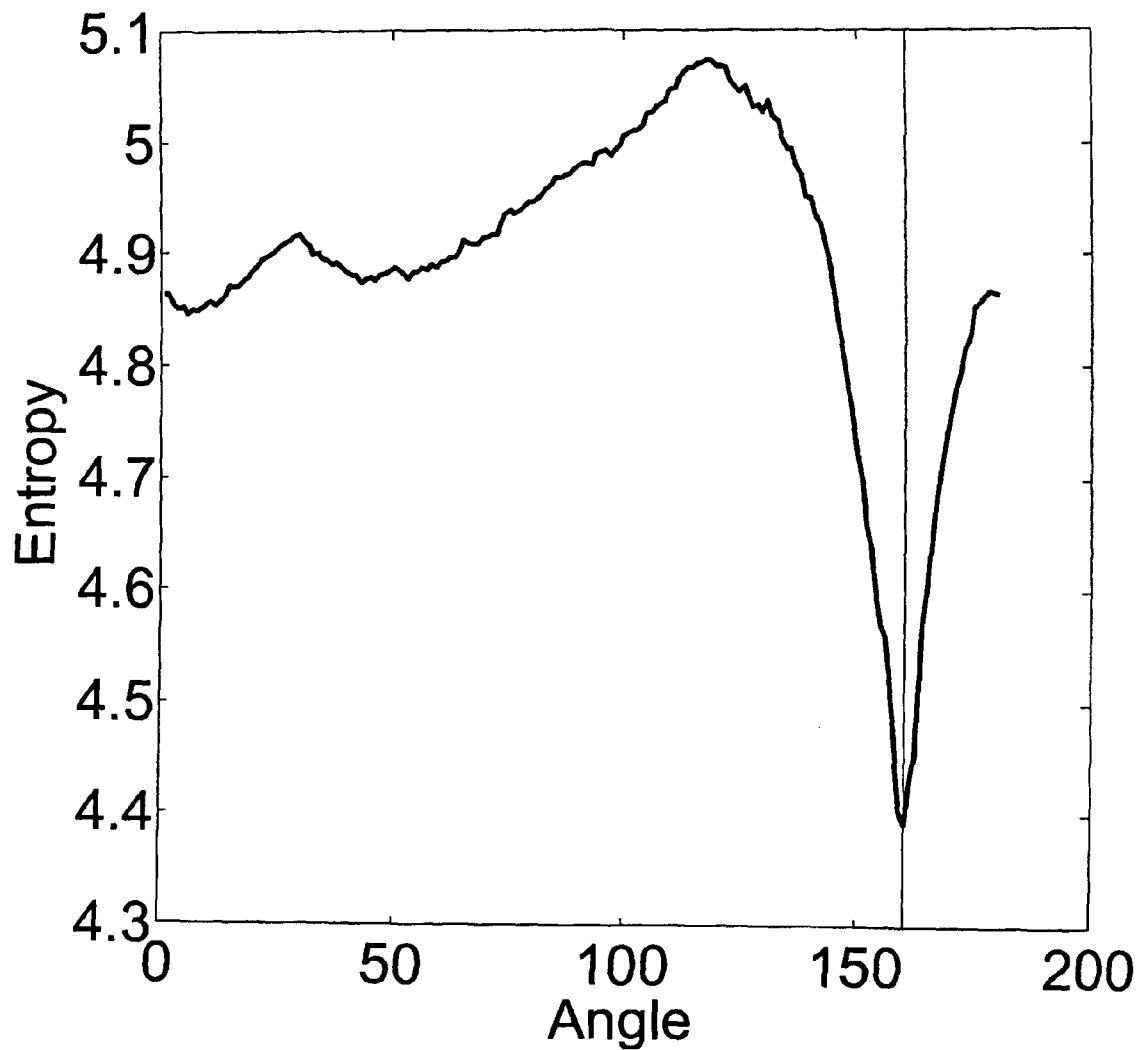
Figure 3: (c)

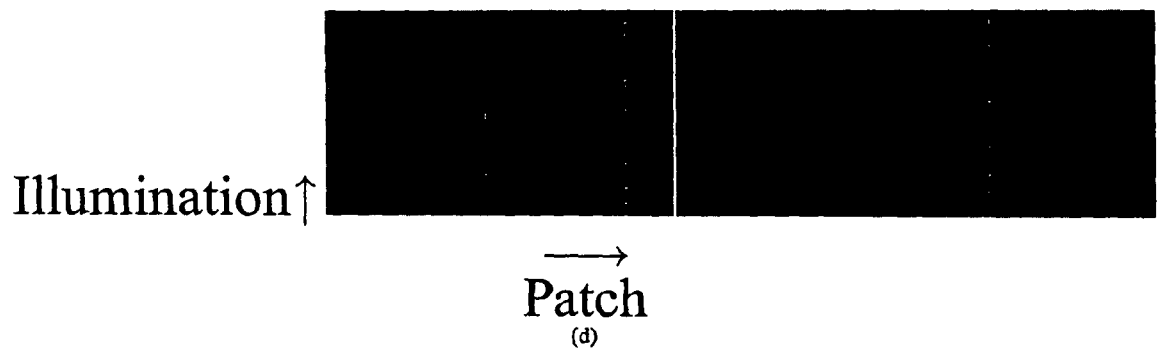
Figure 3: (d)

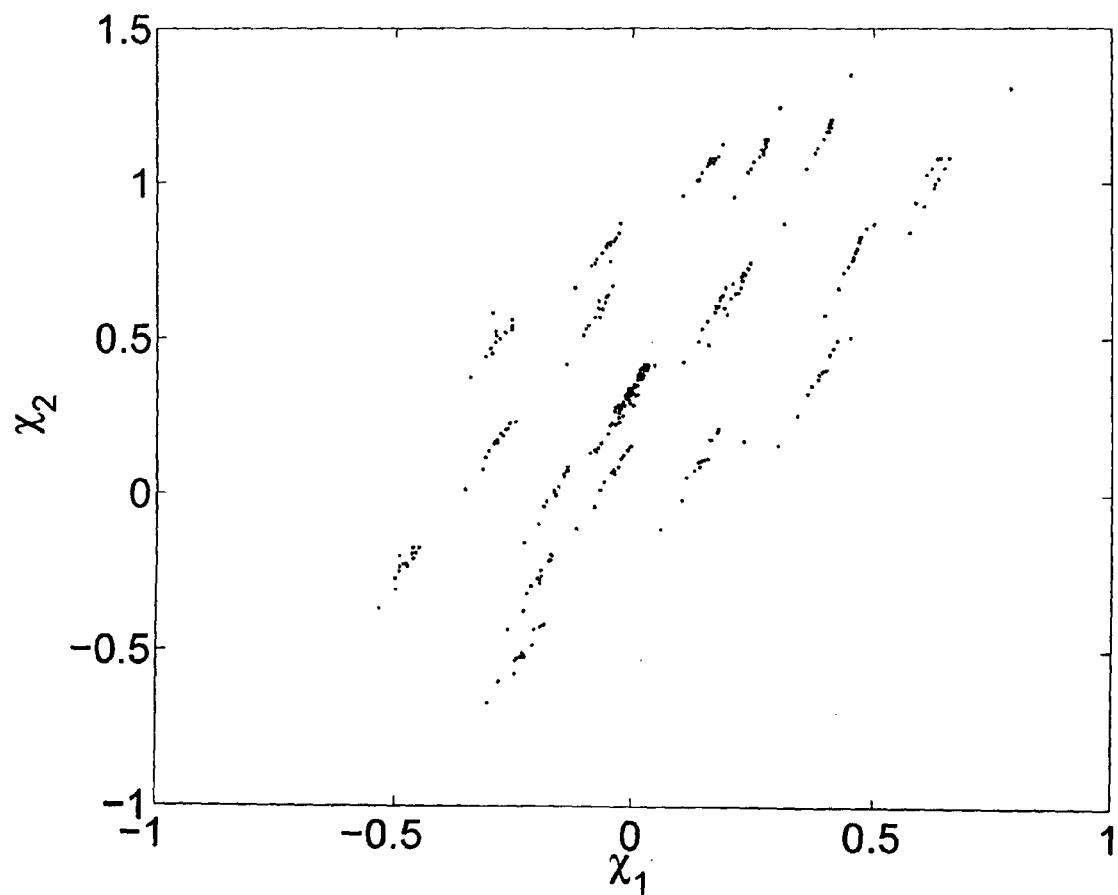
Figure 5: (a)

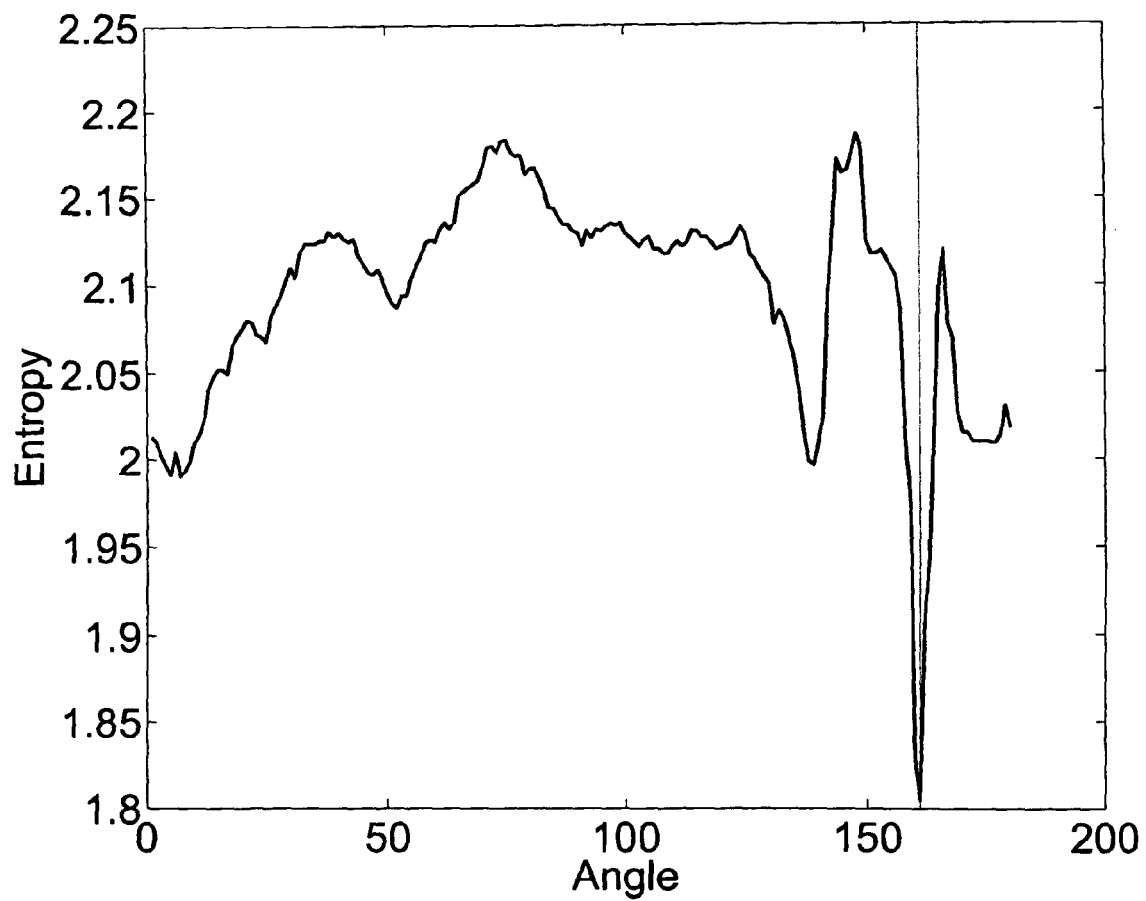
Figure 5: (b)

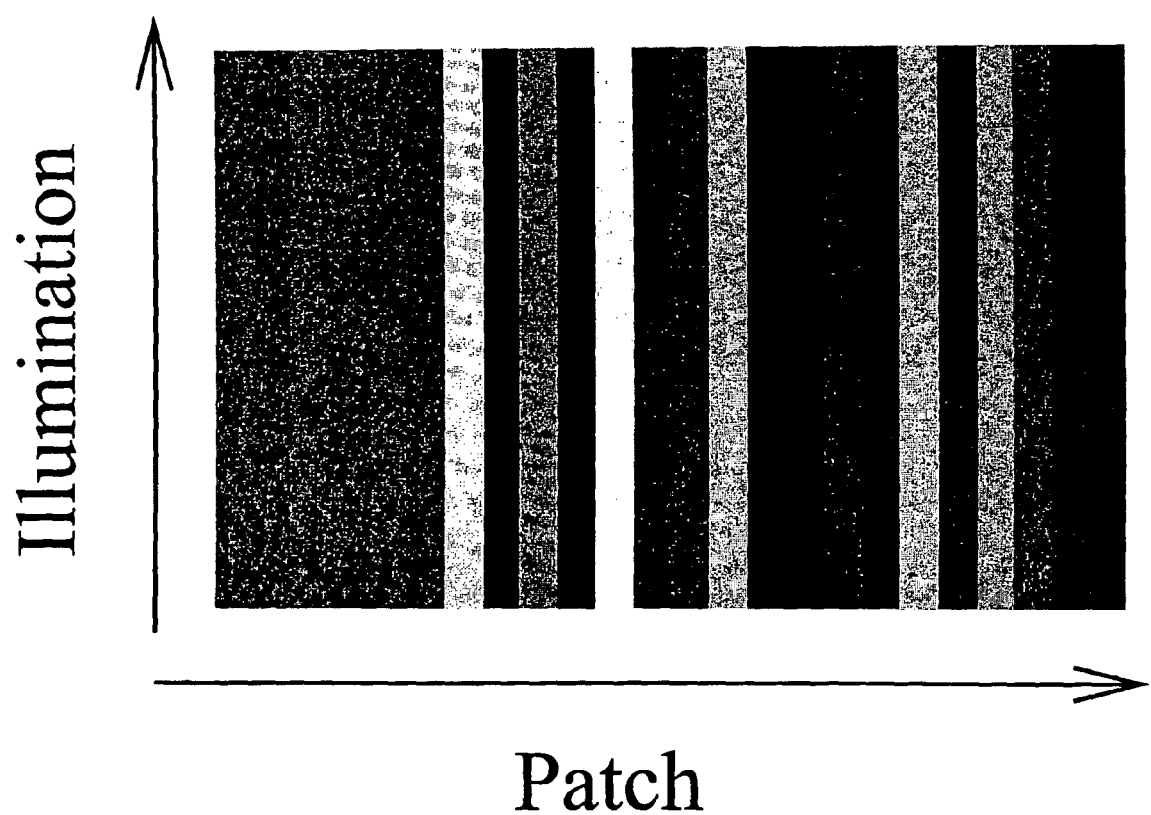
Figure 5: (c)

Figure 6: (a)

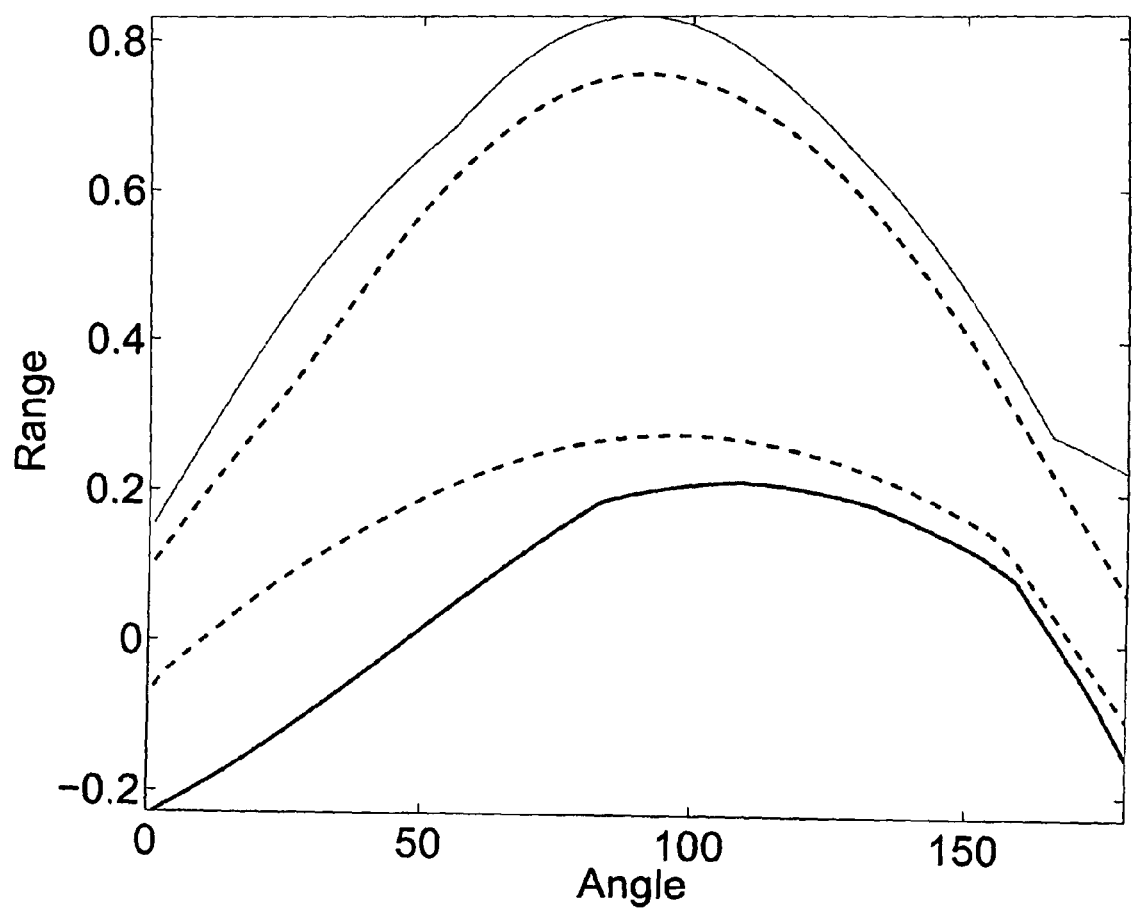
Figure 6: (b)

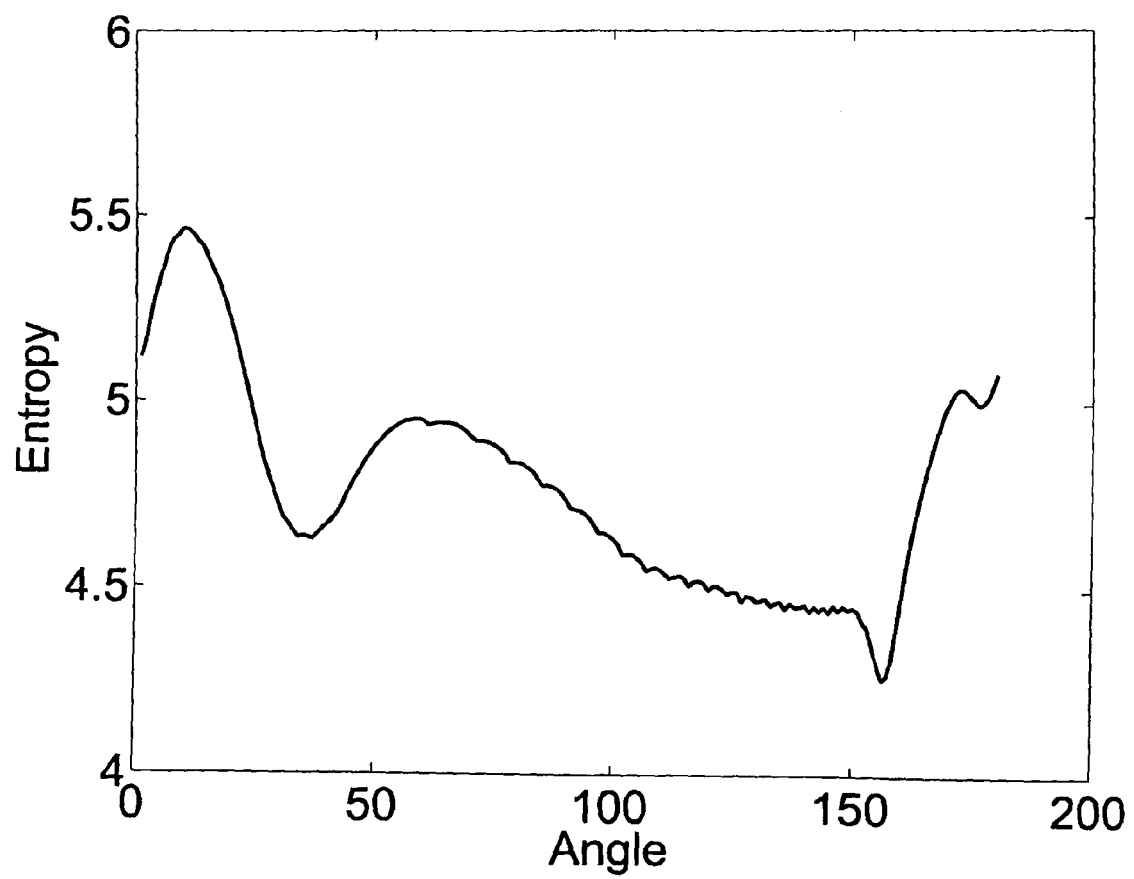
Figure 7: (a)

Figure 7: (b)

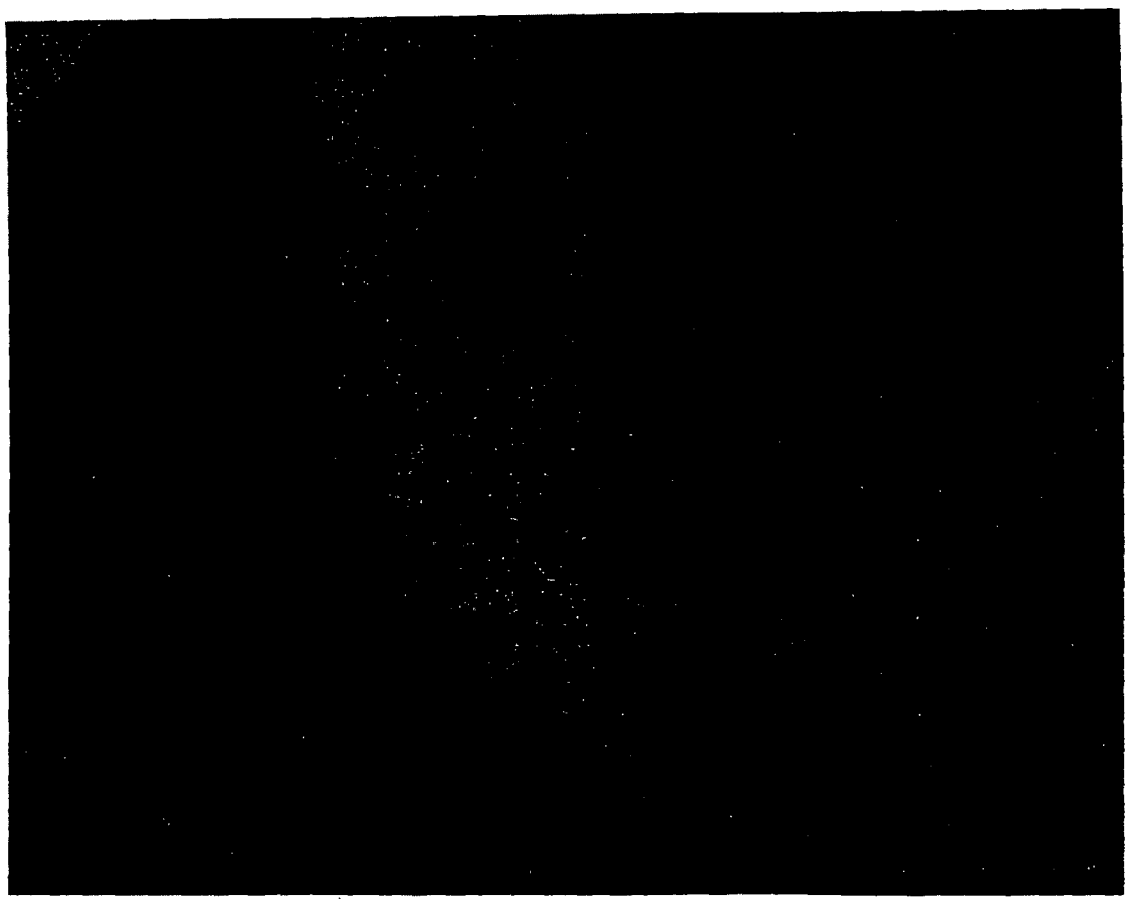
Figure 7: (c)

Figure 7: (d)

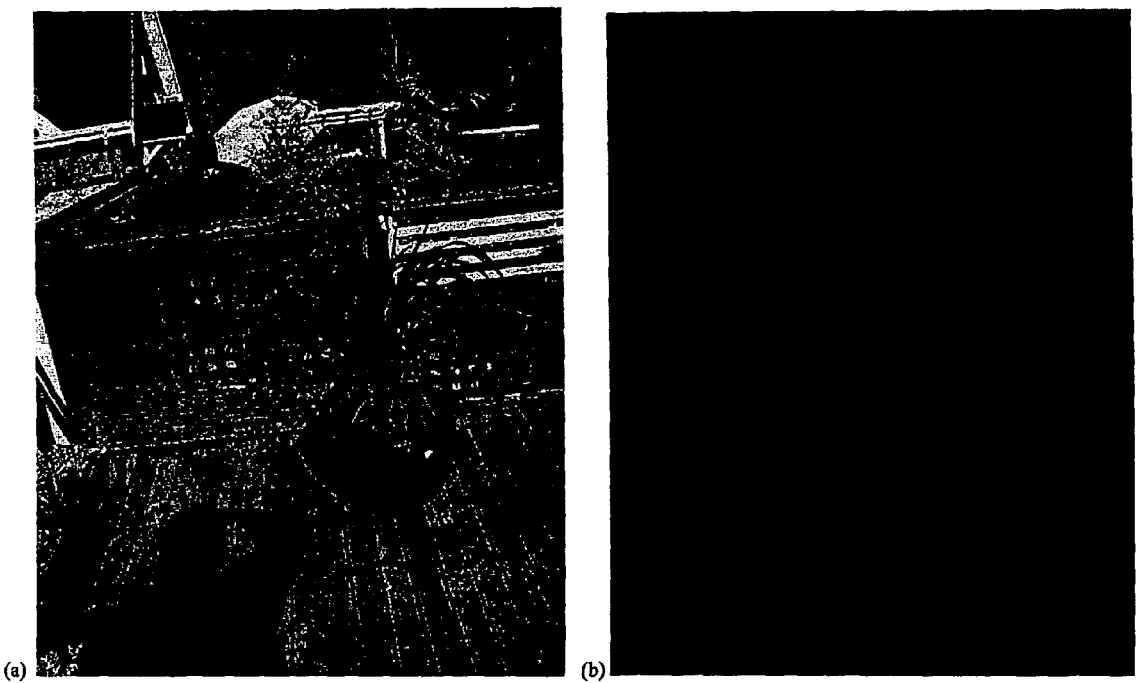
Figure 8: Row 1(a,b)

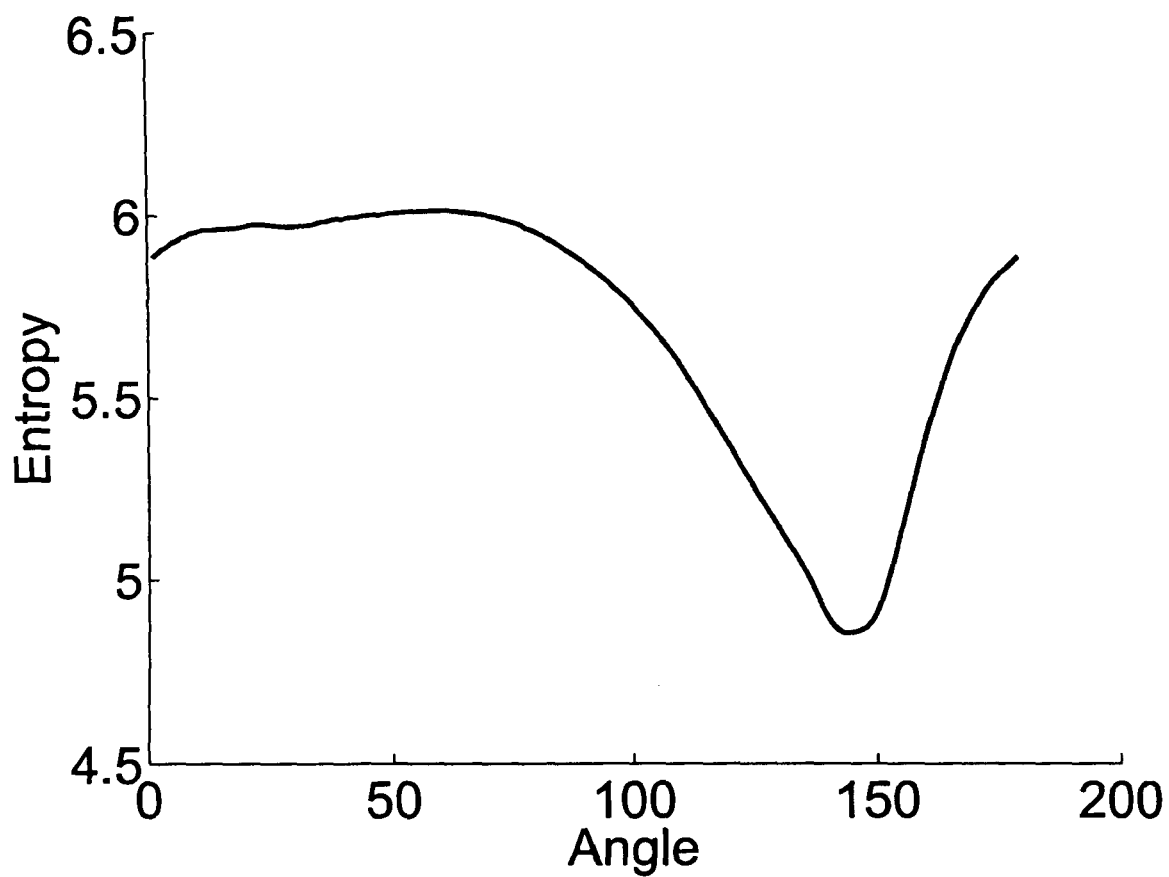
Figure 8: Row 1 (c)

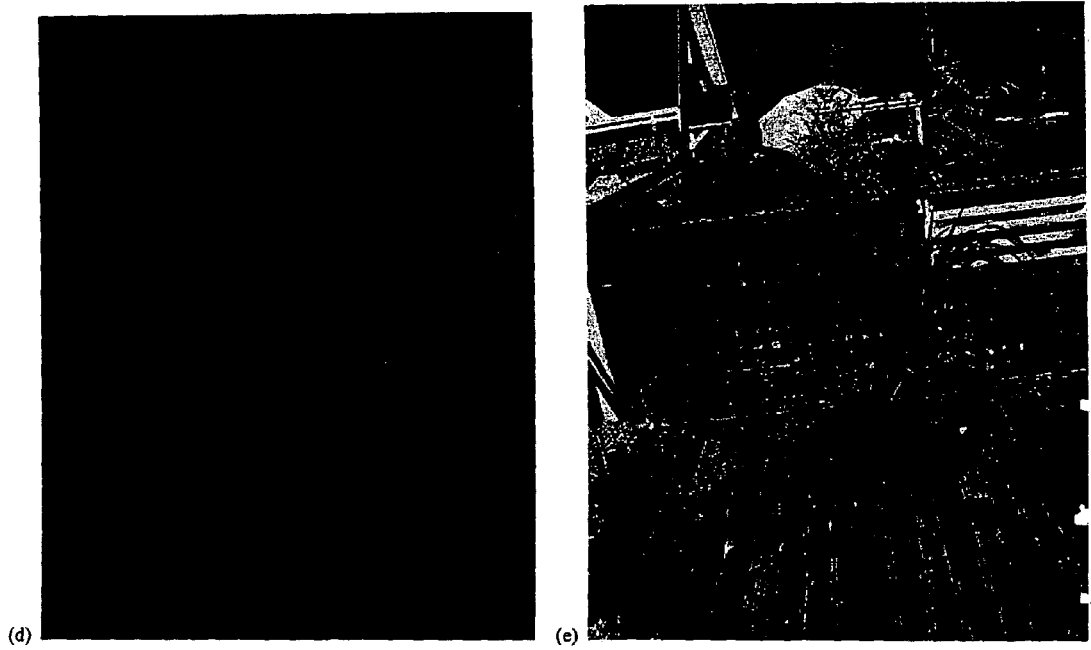
Figure 8: Row 1(d,e)

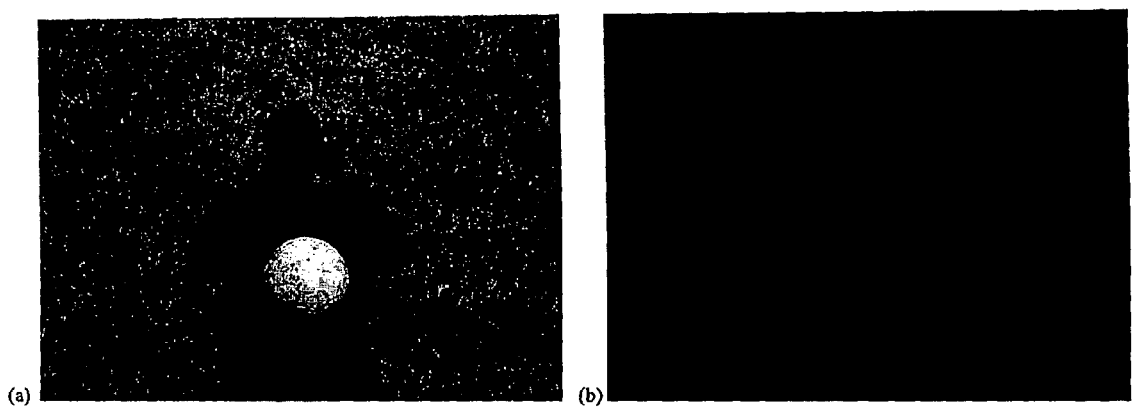
Figure 8: Row 2(a,b)

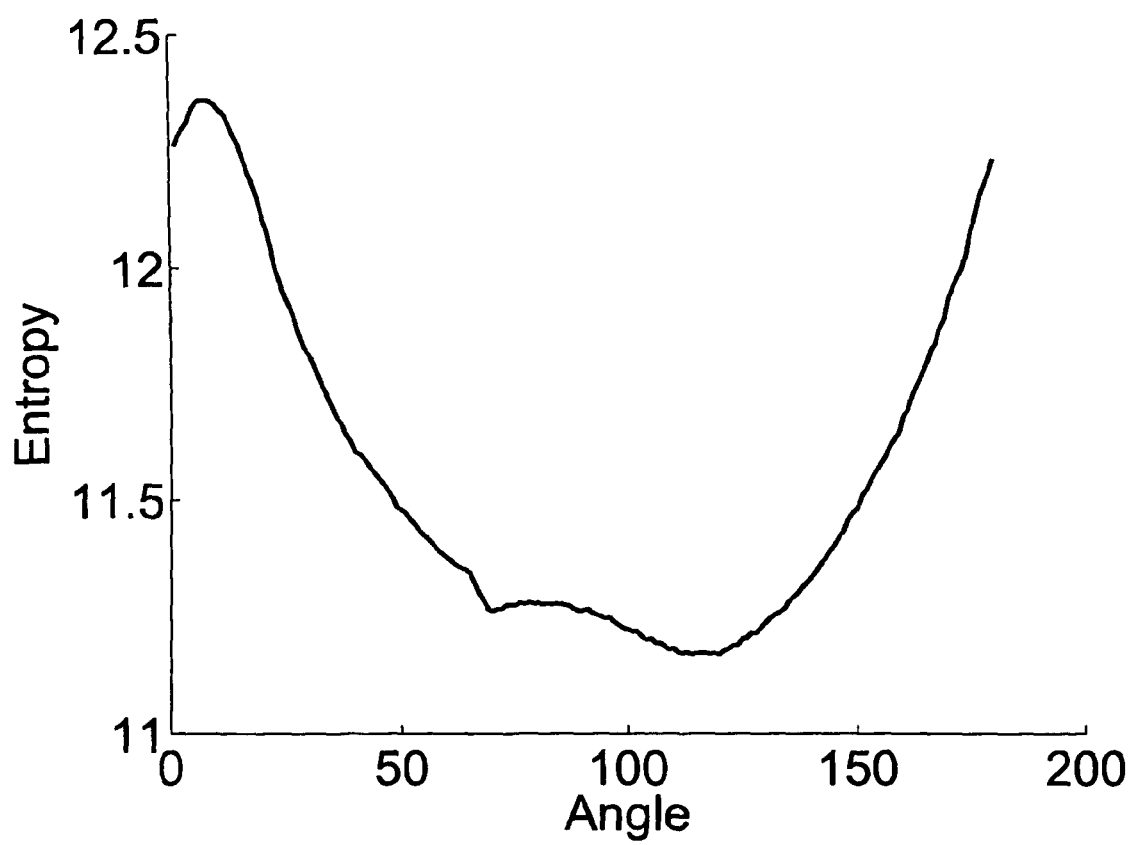
Figure 8: Row 2(c)

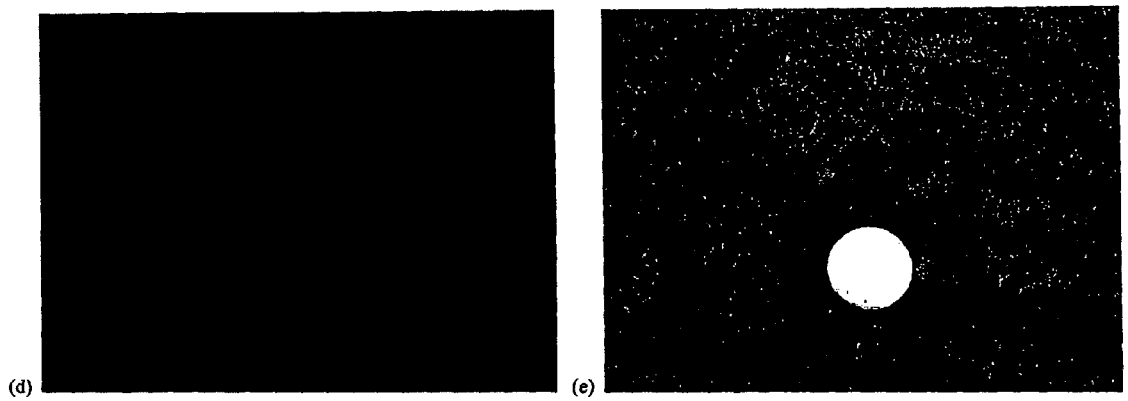
Figure 8: Row 2(d,e)

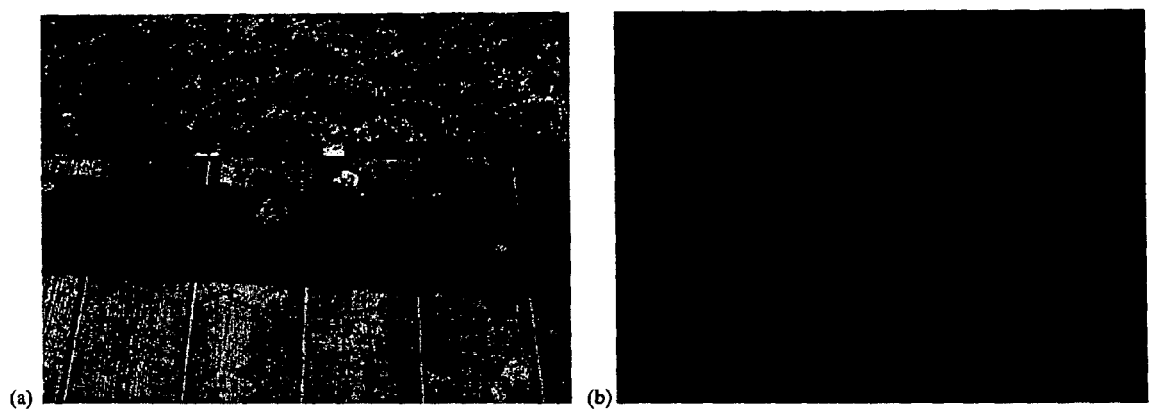
Figure 8: Row 3(a,b)

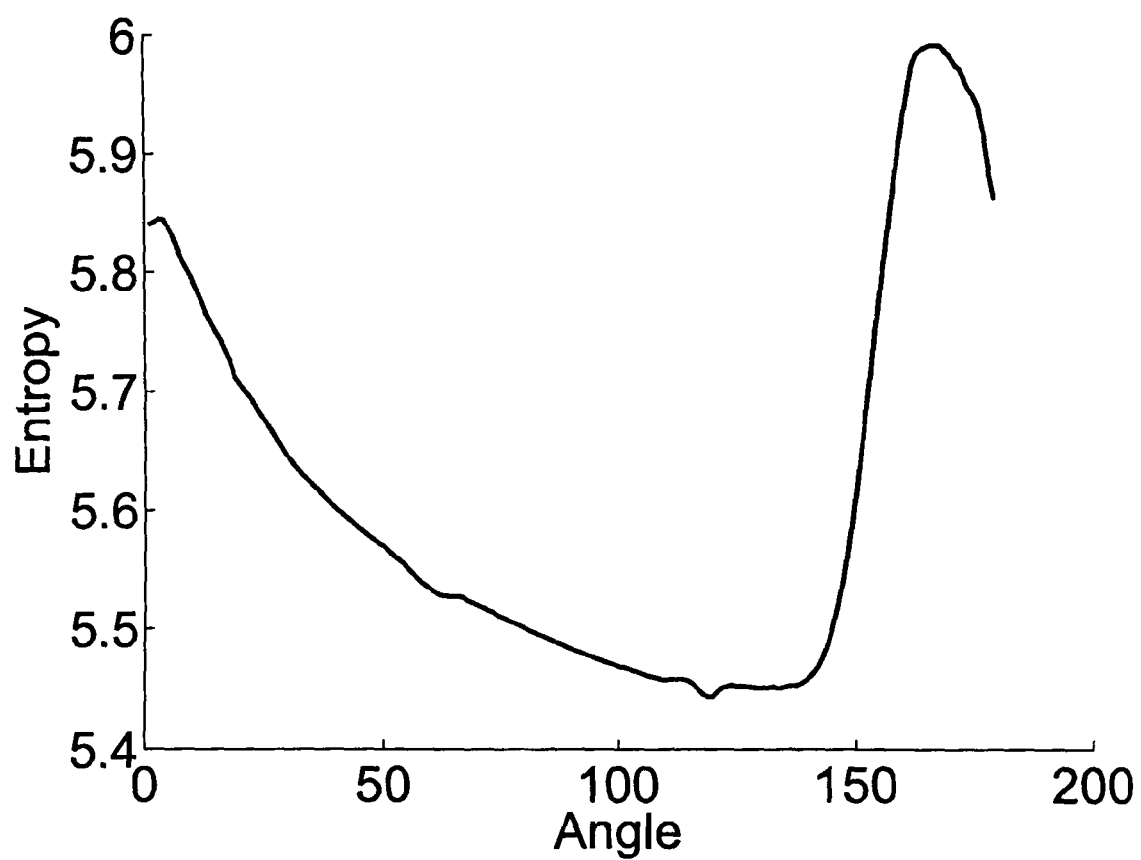
Figure 8: Row 3(c)

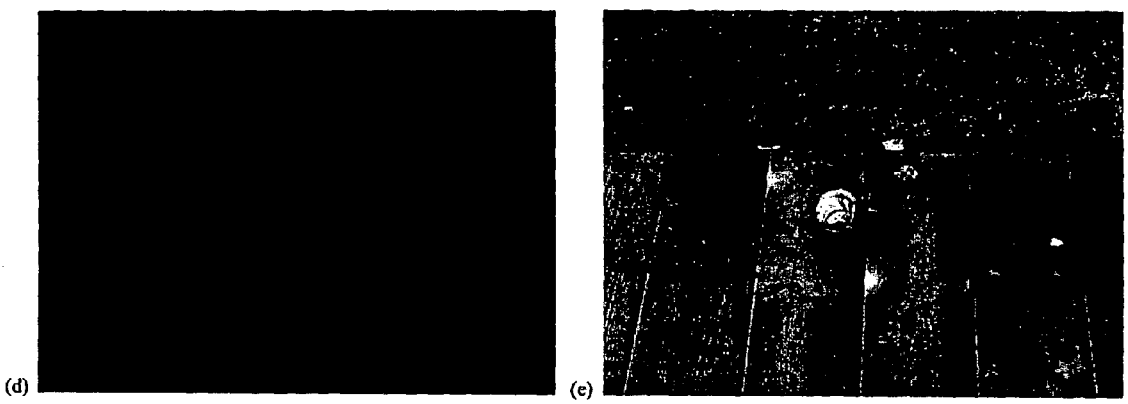
Figure 8: Row 3(d,e)

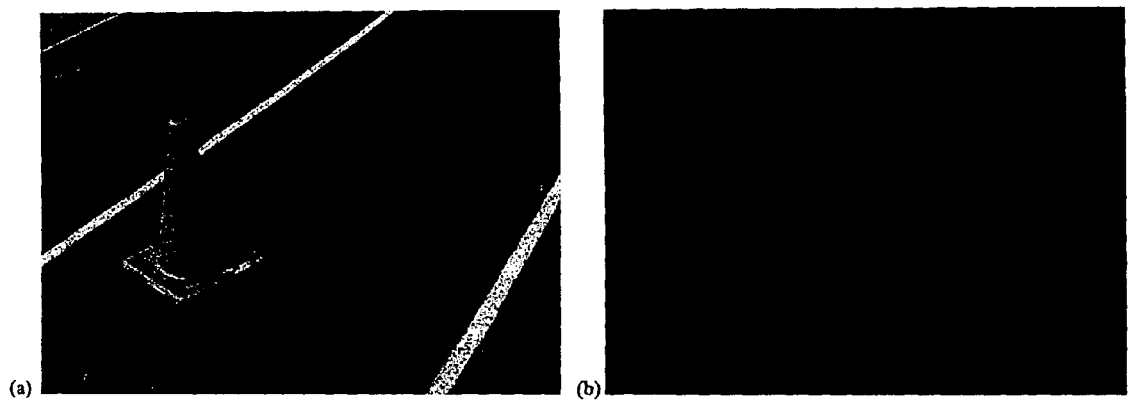
Figure 8: Row 4(a,b)

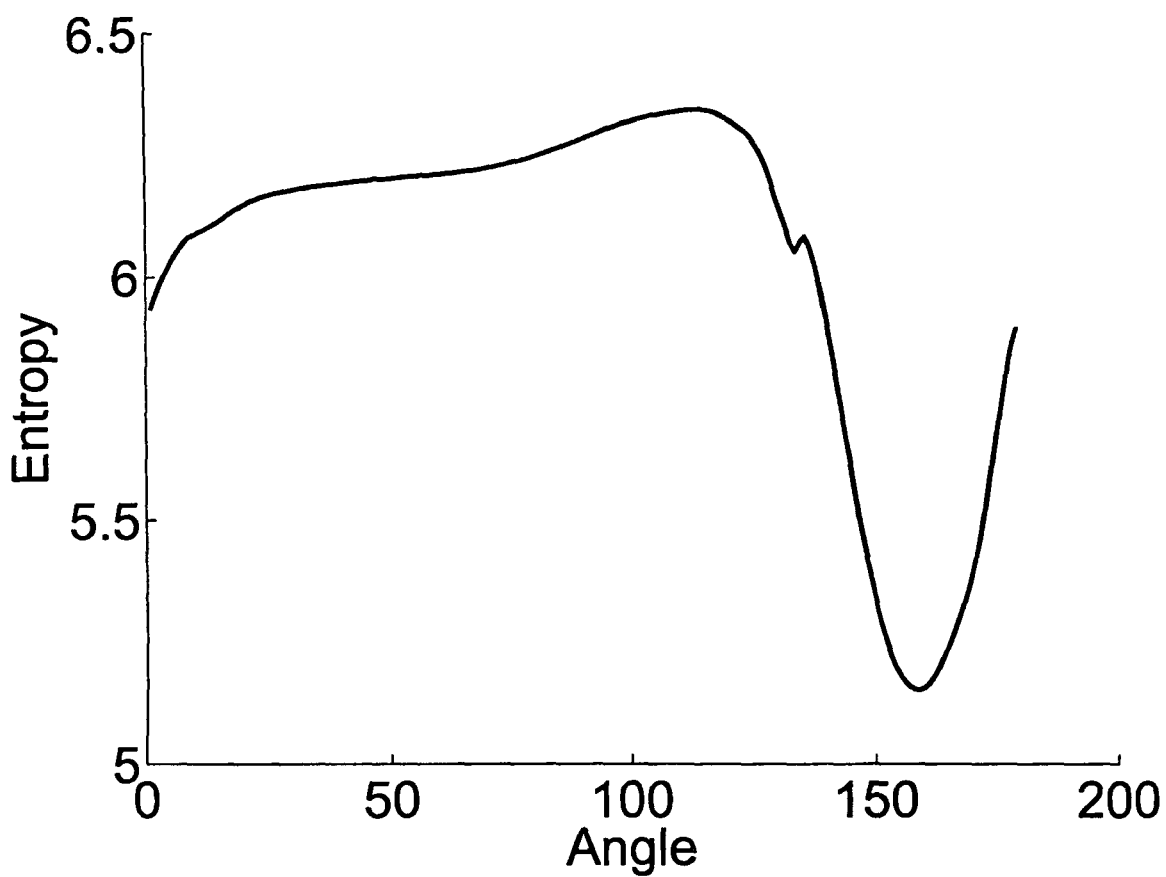
Figure 8: Row 4(c)

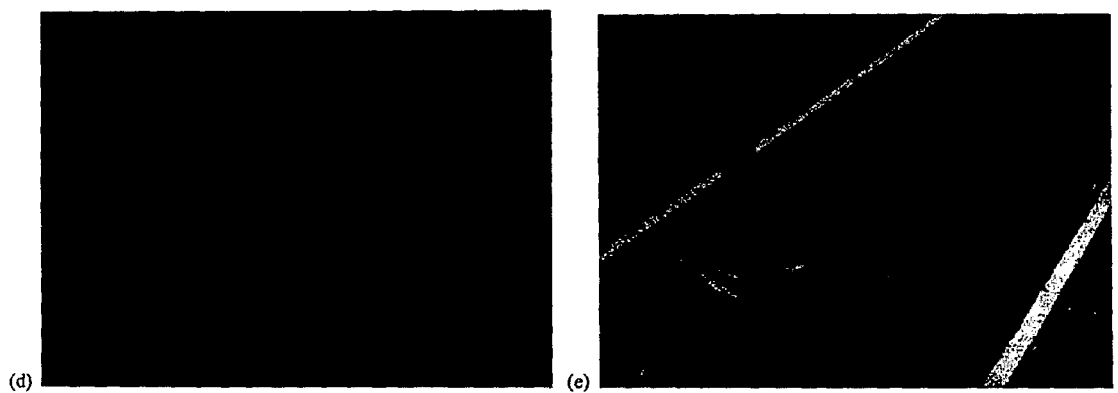
Figure 8: Row 4(d,e)

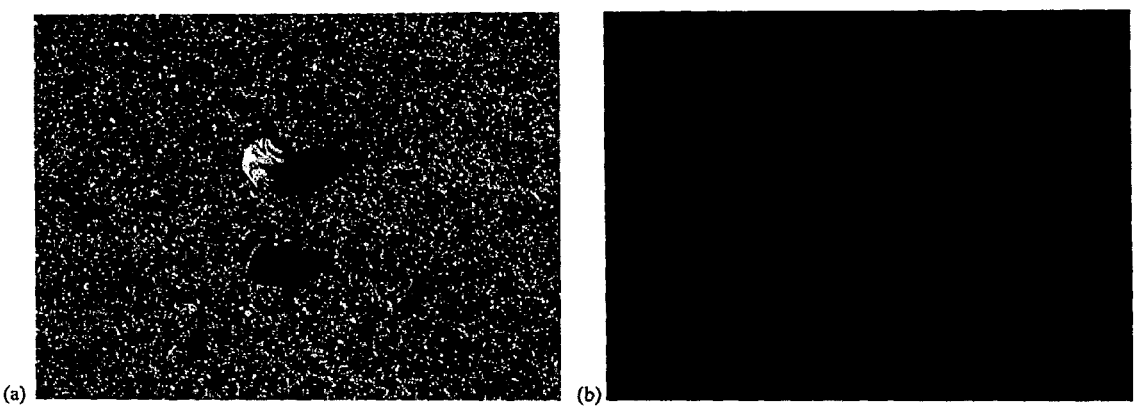
Figure 8: Row 5(a,b)

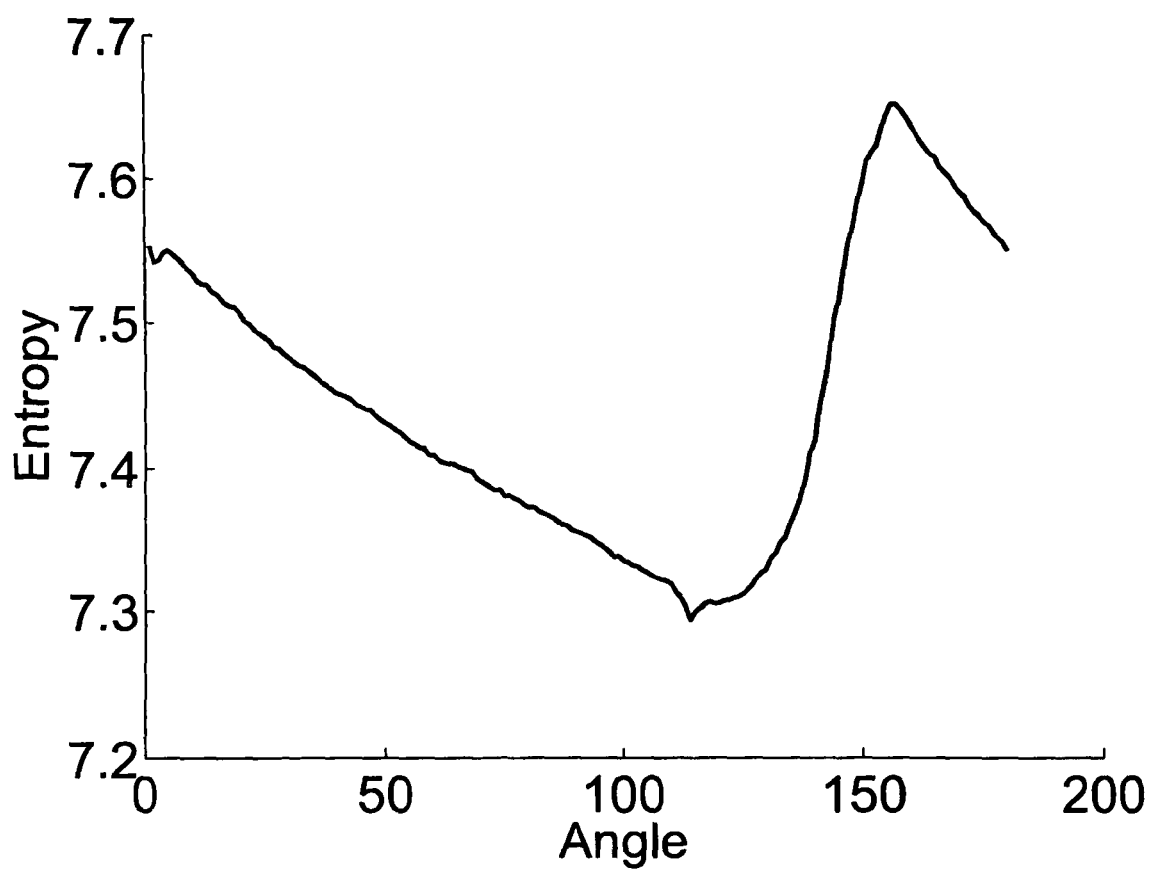
Figure 8: Row 5(c)

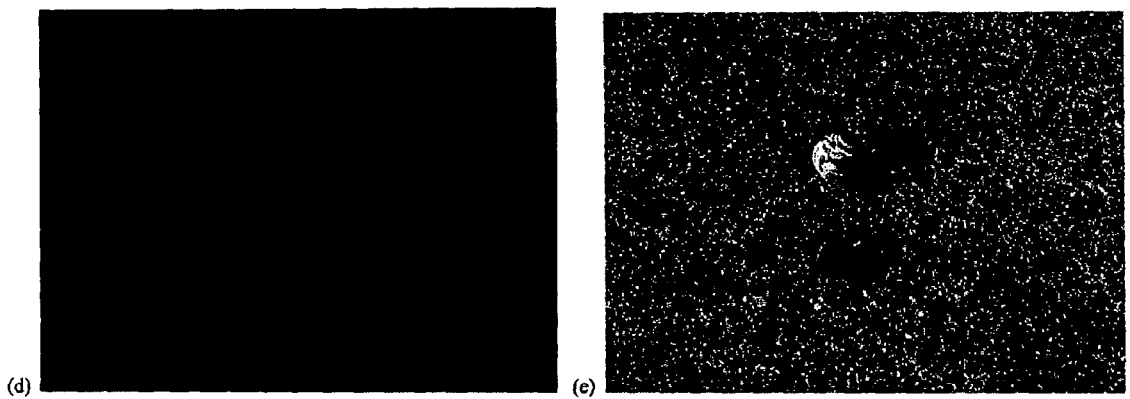
Figure 8: Row 5(d,e)

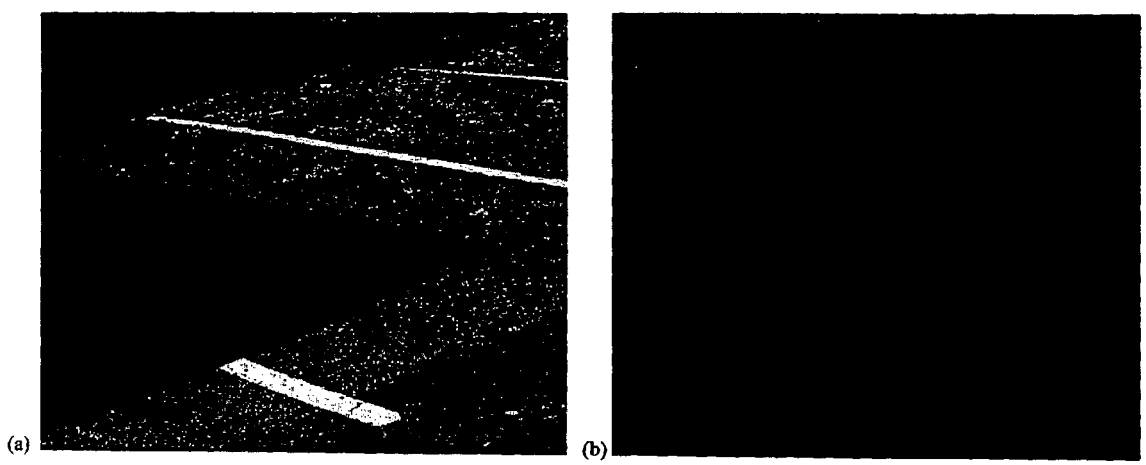
Figure 8: Row 6(a,b)

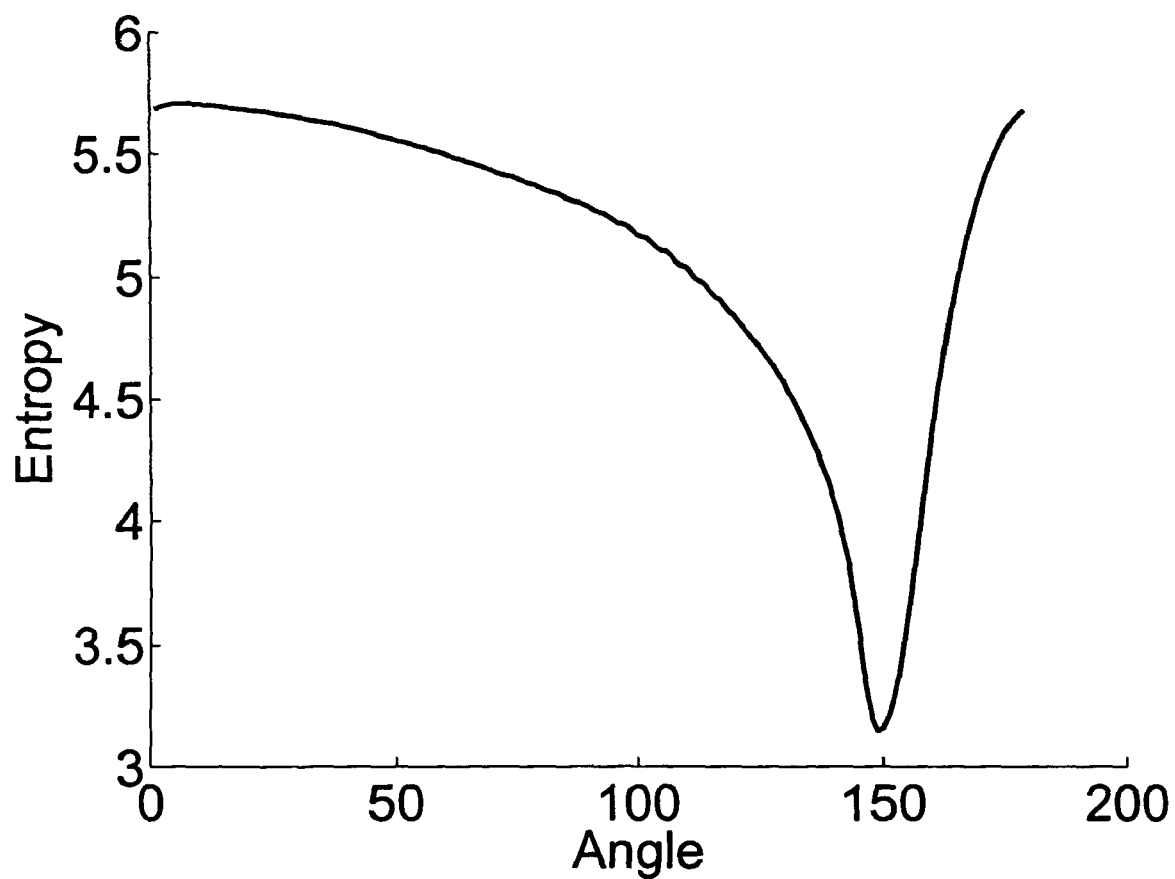
Figure 8: Row 6(c)

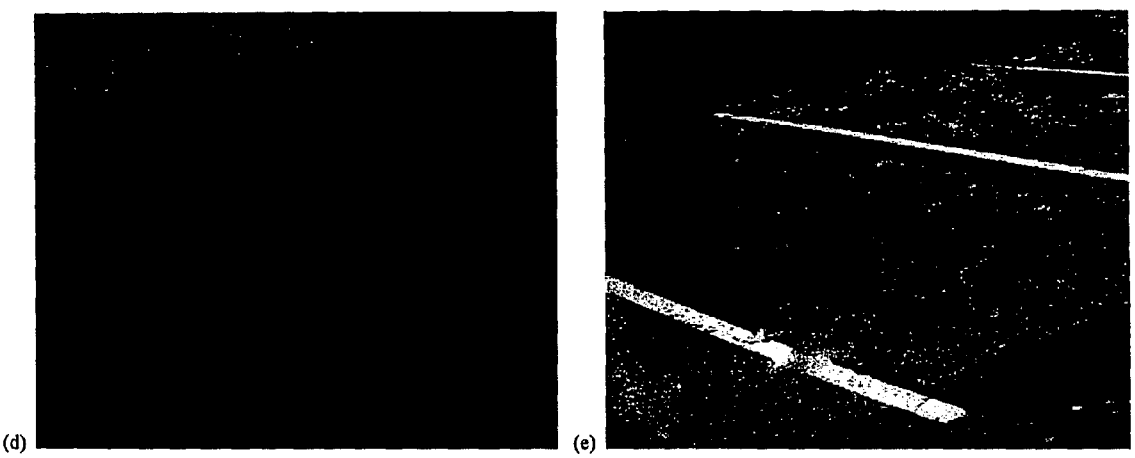
Figure 8: Row 6(d,e)

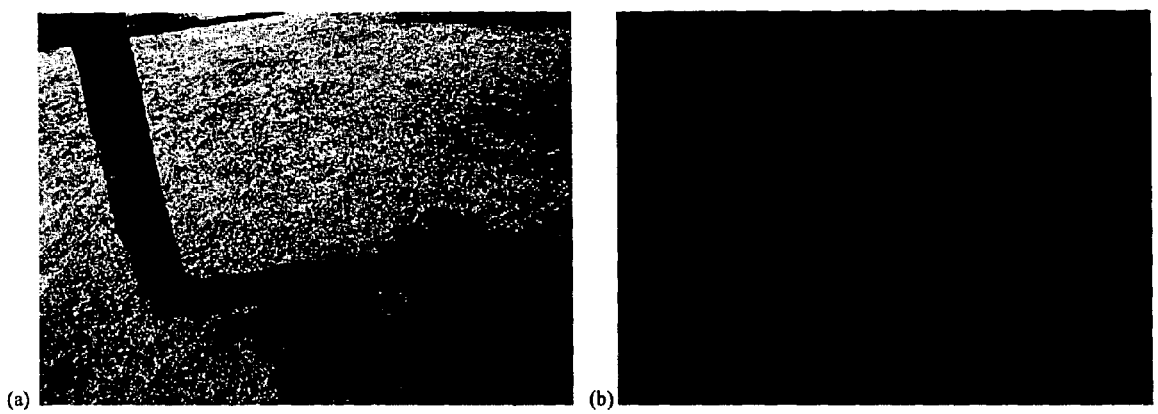
Figure 8: Row 7(a,b)

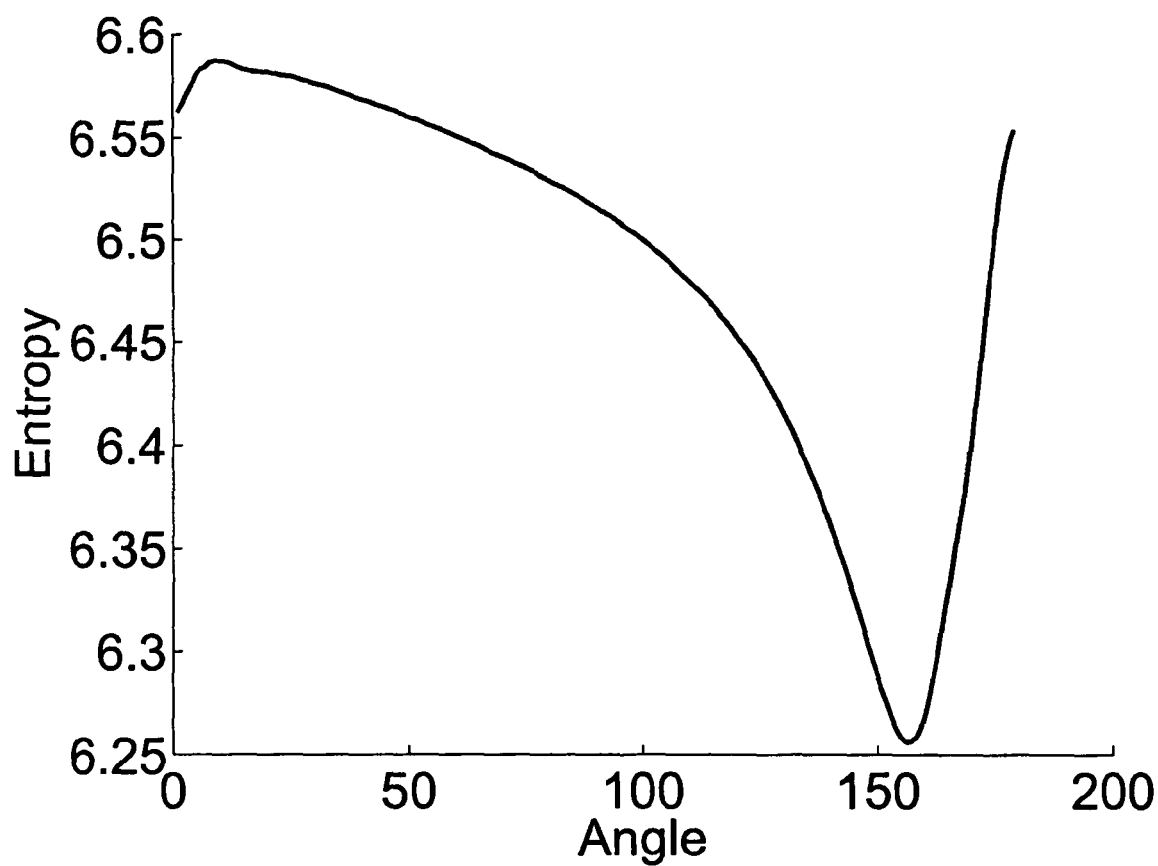
Figure 8: Row 7(c)

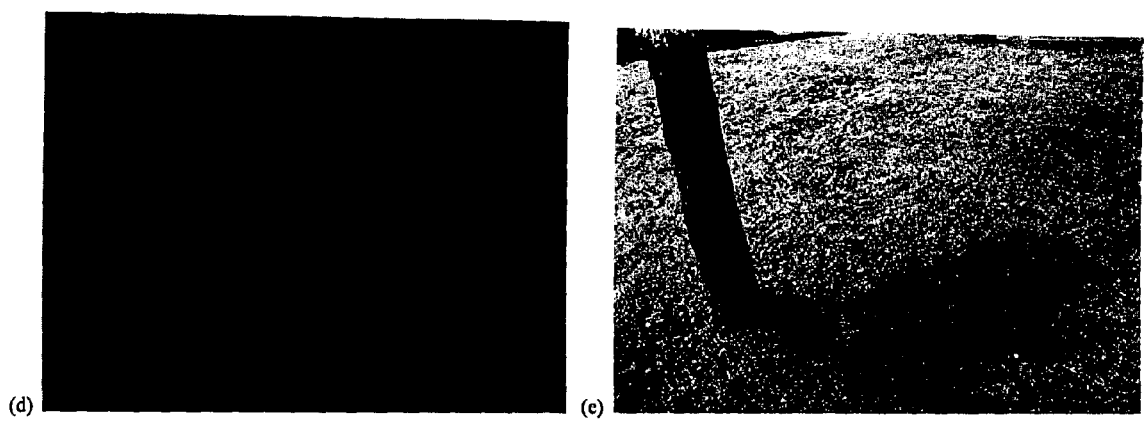
Figure 8: Row 7(d,e)

OBTAINING INTRINSIC IMAGES

BACKGROUND OF THE INVENTION

Recently, a new image processing procedure was devised for creating an illumination-invariant, intrinsic, image from an input colour image [1,2,3,4]. Illumination conditions cause problems for many computer vision algorithms. In particular, shadows in an image can cause segmentation, tracking, or recognition algorithms to fail. An illumination-invariant image is of great utility in a wide range of problems in both ComputerVision and Computer Graphics. However, to find the invariant image, calibration is needed and this limits the applicability of the method.

To date, the method in essence rests on a kind of calibration scheme for a particular colour camera. How one proceeds is by imaging a target composed of colour patches (or, possibly, just a rather colourful scene). Images are captured under differing lightings—the more illuminants the better. Then knowledge that all these images are registered images of the same scene, under differing lighting, is put to use by plotting the capture RGB values, for each of the pixels used, as the lighting changes. If pixels are first transformed from 3D RGB triples into a 2D chromaticity colour space $\{G/R, B/R\}$, and then logarithms are taken, the values across different lighting tend to fall on straight lines in a 2D scatter plot. In fact all such lines are parallel, for a given camera.

If change of illumination simply amounts to movement along such a line, then it is straightforward to devise a 1D illumination-invariant image by projecting the 2D chromaticity points into a direction perpendicular to all such lines. The result is hence a greyscale image that is independent of lighting. In a sense, therefore, it is an intrinsic image that portrays only the inherent reflectance properties in the scene. Since shadows are mostly due to removal of some of the lighting, such an image also has shadows removed. We can also use the greyscale, invariant, image as a guide that allows us to determine which colours in the original, RGB, colour image are intrinsic to the scene or are simply artifacts of the shadows due to lighting. Forming a gradient of the image's colour channels, we can guide a thresholding step via the difference between edges in the original and in the invariant image [3]. Forming a further derivative, and then integrating back, we can produce a result that is a 3-band colour image which contains all the original salient information in the image, except that the shadows are removed. Although this method is based on the greyscale invariant image developed in [1], which produces an invariant image which does have shading removed, it is of interest because its output is a colour image, including shading. In another approach [4], a 2D-colour chromaticity invariant image is recovered by projecting orthogonal to the lighting direction and then putting back an appropriate amount of lighting. Here we develop a similar chromaticity illumination-invariant image which is more well-behaved and thus gives better shadow removal.

For Computer Vision purposes, in fact an image that includes shading is not always required, and may confound certain algorithms—the unreal look of a chromaticity image without shading is inappropriate for human understanding but excellent for machine vision (see, e.g., [5] for an object tracking application, resistant to shadows).

SUMMARY OF THE INVENTION

According to a first aspect, the invention provides a method for recovery of an invariant image from an original image, the method including the step of determining an angle of an invariant direction in a log-chromaticity space by minimising entropy in the invariant image.

A preferred method comprises the steps of forming 2D log-chromaticity representation of the original image; for each of a plurality of angles, forming as a grey scale image the projection onto a 1D direction and calculating the entropy; and selecting the angle corresponding to the minimum entropy as the correct projection recovering the invariant image.

The invention also provides an apparatus for performing the above method.

According to a second aspect, the invention provides a method of handling an image from an uncalibrated source to obtain an intrinsic image, comprising imaging a scene under a single illuminant, forming the log-chromaticity image 2-vector $\rho$, projecting said vector into a direction corresponding to each of a plurality of angles, forming a histogram, calculating the entropy, identifying the angle corresponding to minimum entropy, and generating an intrinsic image corresponding to the identified angle.

The invention also provides a computer when programmed to perform the above methods.

According to a third aspect, the invention provides a system for handling images comprising means for imaging a scene under a single illuminant, means for forming the log-chromaticity image 2-vector $\rho$, means for projecting said vector into a direction corresponding to each of a plurality of angles, means for forming a histogram, means for calculating the entropy, means for identifying the angle corresponding to minimum entropy, and means for generating an intrinsic image corresponding to the identified angle.

The problem we consider, and solve, in this specification is the determination of the invariant image from unsourced imagery—images that arise from cameras that are not calibrated. The input is a colour image with unknown provenance, one that includes shadows, and the output is the invariant chromaticity version, with shading and shadows removed.

To see how we do this let us remember how we find the intrinsic image for the calibrated case. This is achieved by plotting 2D log-chromaticities as lighting is changed and observing the direction in which the resulting straight lines point—the "invariant direction"—and then projecting in this direction. The present invention is based on the realisation that, without having to image a scene under more than a single illuminant, projecting in the correct direction minimizes the entropy in the resulting greyscale image.

BRIEF DESCRIPTION OF THE DRAWINGS

FIG. 1 illustrates intuition for finding the best direction by means of minimising the entropy;

FIG. 2a is a schematic view of the Macbeth Color Checker chart;

FIG. 2b shows the log-chromaticities for the 24 surfaces of the chart of FIG. 2a;

FIG. 2c shows the median chromaticities for the six of the patches, imaged under fourteen different Planckian illuminants;

FIG. 3a shows the responses of typical RGB camera sensors, in this case of a Sony DX930 camera;

FIG. 3b shows the responses of theoretical RGB camera sensors;

FIG. 3c shows a plot of entropy against angle;

FIG. 3d shows an invariant image for a theoretical synthetic image, with the same grey levels across illuminants;

FIG. 5a shows 2D chromaticity for measured colour patches for a HP-912 camera;

FIG. 5b shows a plot of entropy against angle;

FIG. 5c shows an invariant image for measured patch values, with projected grey levels the same for different illuminants;

FIG. 6a represents an input colour image, captured with a HP-912 digital still camera with linear output;

FIG. 6b shows plots of a range of projected data changes against projection angle;

FIG. 7a shows a plot of entropy of projected image against projection angle;

FIG. 7b shows a grey scale invariant image at minimum entropy direction;

FIG. 7c shows an invariant chromaticity image;

FIG. 7d represents a re-integrated RGB colour image; and

FIG. 8 shows additional invariant images for minimum entropy, with the columns showing from, left to right, the original image, the $L_1$ chromaticity image, the entropy plot, the invariant $L_1$ chromaticity and the reintegrated colour image.

Figure 4:
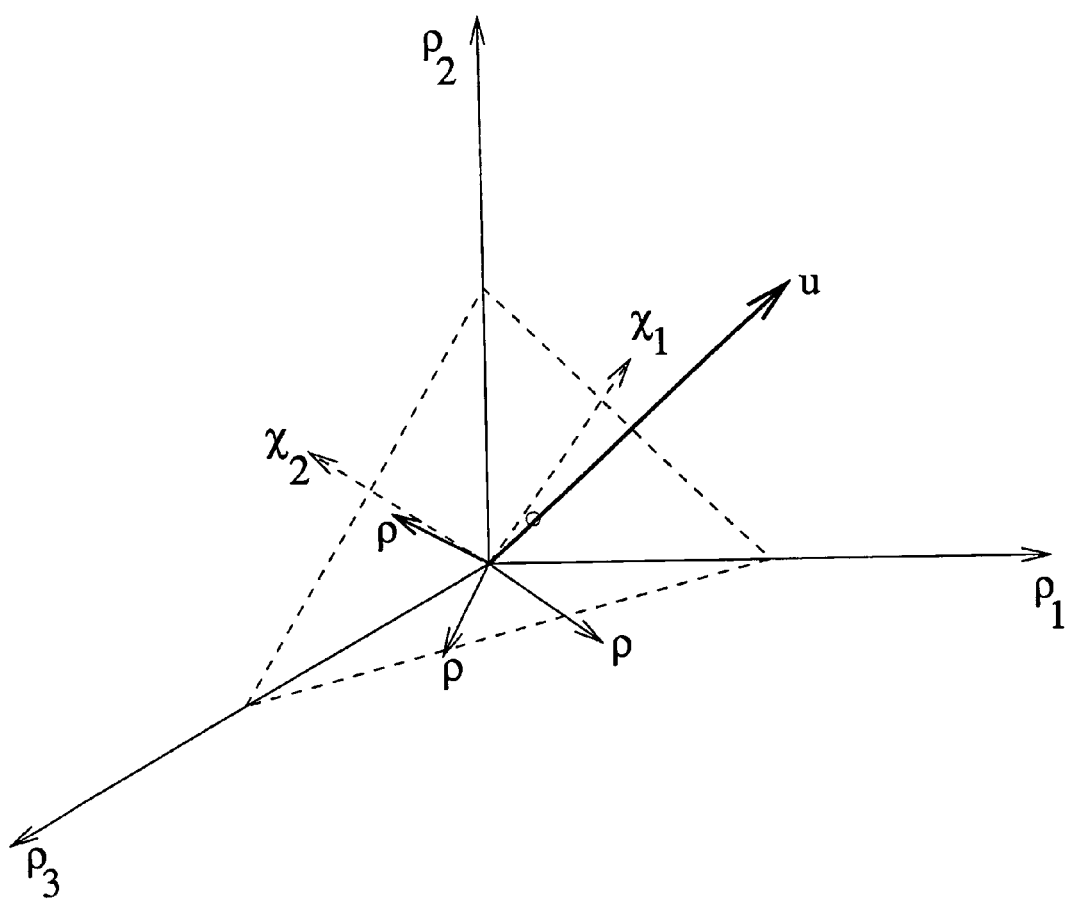
FIG. 4 illustrates geometric mean 2-D chromaticity space.

Colour versions of the above Figures are already publicly available at http://www.cs.sfu.ca/~mark/ftp/Eccv04/

DESCRIPTION OF THE DRAWINGS

If one considers a set of colour patches under changing lighting, as lighting changes, for each colour patch, pixels occupy an approximately straight line in a 2D log-chromaticity space. If we project all these pixels onto a line perpendicular to the set of straight lines, we end up with a set of 1D points, as in FIG. 1(a). In a set of real images of colour patches, we would expect a set of peaks, each well separated from the others and corresponding to a single colour patch. On the other hand, if we instead project in some other direction, as in FIG. 1(b), then instead of pixels located in sharp peaks of occurrence we expect the distribution of pixels along our 1D projection line to be spread out. In terms of histograms, in the first instance, in which we guess the correct direction and then project, we see a distribution with a set of sharp peaks, with resulting low entropy. In the second instance we instead see a broader histogram, with resulting higher entropy.

Hence aspects of the present invention seek to recover the correct direction in which to project by examining the entropy of a greyscale image that results from projection and identifying as the correct "invariant direction" that which minimizes the entropy of the resulting image. Changing lighting is automatically provided by the shadows in the image themselves.

In the following, we first recapitulate the problem of lighting change in imagery, along with the accompanying theory of image formation. The method of deriving an invariant image is given, for known invariant direction, for imagery that was captured using a calibrated camera. Now, without any calibration or foreknowledge of the invariant direction, we then create a synthetic "image" that consists of a great many colour patches. Since the image is synthetic, we in fact do know the ground truth invariant direction. Examining the question of how to recover this direction from a single image, with no prior information, we show that minimizing the entropy provides a very strong indicator for determining the correct projection. For a synthetic image, results are very good indeed. This result provides a proof in principle for the entropy-minimizing method.

But how do we fare with a real camera? We consider a set of calibration images, taken with a known camera. Since we control the camera, and the target, we can establish the invariant direction. Then comparing to the direction recovered using entropy minimization, we find that not only is the direction of projection recovered correct (within 3 degrees), but also the minimum is global and is a very strong signal. Entropy minimization is a new and salient indicator for the projection that removes shadows.

Real, non-synthesized, images are noisy and might not provide such a clean picture. Nevertheless, by examining real images, we arrive at a set of steps that will correctly deliver the intrinsic image, without calibration. Finally, we apply the method devised to unsourced images, from unknown cameras under unknown lighting, with unknown processing applied. Results are again strikingly good, leading us to conclude that the method indeed holds great promise for developing a stand-alone approach to removing shadows from (and therefore conceivably re-lighting) any image, e.g. images consumers take to the neighbourhood processing lab.

Theory of Invariant Image Formation

Planckian Lighting, Lambertian Surfaces, Narrowband Camera

Suppose we consider a fairly narrow-band camera, with three sensors, Red, Green, and Blue, as in FIG. 3(a); these are sensor curves for the Sony DXC930 camera. Now if we image a set of coloured Lambertian surfaces under a particular Planckian light, in a controlled light box, say, then for each pixel the log of the band-ratios [R/G,B/G] appears as a dot in a 2D plot. Chromaticity removes shading, for Lambertian reflectances under orthography, so every pixel in each patch is approximately collapsed into the same dot (no matter if the surface is curved). FIG. 2(b) shows the log-chromaticities for the 24 surfaces of the Macbeth ColorChecker Chart shown schematically in FIG. 2(a) (the six neutral patches all belong to the same cluster). These images were captured using an experimental HP912 Digital Still Camera, modified to generate linear output.

For narrow-band sensors (or spectrally-sharpened ones [6]), and for Planckian lights (or lights such as Daylights which behave as if they were Planckian), as the illuminant temperature T changes, the log-chromaticity colour 2-vector moves along an approximately straight line which is independent of the magnitude and direction of the lighting. FIG. 2(c) illustrates this for 6 of the patches: the plot is for the same 6 patches imaged under a range of different illuminants. In fact, the camera sensors are not exactly narrow-band and the log-chromaticity line is only approximately straight. Assuming that the change with illumination is indeed linear, projecting colours perpendicular to this "invariant direction" due to lighting change produces a 1D greyscale image that is invariant to illumination. Note that the invariant direction is different for each camera; it can be recovered from a calibration with plots such as FIG. 2(c). In this specification, we recover the correct direction from a single image, and with no calibration.

Let us recapitulate how this linear behaviour with lighting change results from the assumptions of Planckian lighting, Lambertian surfaces, and a narrowband camera. Consider the RGB colour R formed at a pixel, for illumination with spectral power distribution $E(\lambda)$ impinging on a surface with surface spectral reflectance function $S(\lambda)$. If the three camera sensor sensitivity functions form a set $Q(\lambda)$, then we have $$R_k = \sigma \int E(\lambda)S(\lambda)Q_k(\lambda)d\lambda, \quad k = R, G, B, \qquad (1)$$

where $\sigma$ is Lambertian shading: surface normal dotted into illumination direction.

If the camera sensor $Q_k(\lambda)$ is exactly a Dirac delta function $Q_k(\lambda) = q_k \delta(\lambda - \lambda_k)$, then eq. (1) becomes simply $$R_k = \sigma E(\lambda_k) S(\lambda_k) q_k \qquad (2)$$

Now suppose lighting can be approximated by Planck's law, in Wien's approximation [7]:

$$E(\lambda, T) \simeq I k_1 \lambda^{-5} e^{-\frac{k_2}{T\lambda}}, \qquad (3)$$

with constants $k_1$ and $k_2$. Temperature T characterizes the lighting colour and I gives the overall light intensity.

In this approximation, from (2) the RGB colour $R_k$, k=1 ... 3, is simply given by $$R_k = \sigma I k_1 \lambda_k^{-5} e^{-\frac{k_2}{T\lambda_k}} S(\lambda_k) q_k \qquad (4)$$

Let us now form the band-ratio 2-vector chromaticities c, $$c_k = R_k/R_p,$$

where p is one of the channels and k=1, 2 indexes over the remaining responses. We could use p=1 (i.e., divide by Red) and so calculate $c_1 = G/R$ and $c_2 = B/R$. We see from eq. (4) that forming the chromaticity effectively removes intensity and shading information. If we now form the log of (5), with $s_k \equiv k_1 \lambda_k^{-5} S(\lambda_k) q_k$ and $e_k \equiv -k_2/\lambda_k$ we obtain $$\rho_k \equiv \log(c_k) = \log(s_k/s_p) + (e_k - e_p)/T \qquad (6)$$

Eq. (6) is a straight line parameterized by T. Notice that the 2-vector direction $(e_k - e_p)$ is independent of the surface, although the line for a particular surface has offset that depends on $s_k$.

An invariant image can be formed by projecting 2D logs of chromaticity, $\rho_k$, k=1, 2, into the direction $e\perp$ orthogonal to the vector $e \equiv (e_k - e_p)$. The result of this projection is a single scalar which we then code as a greyscale value.

The utility of this invariant image is that since shadows derive in large part from lighting that has a different intensity and colour (temperature T) from lighting that impinges in non-shadowed parts of the scene, shadows are effectively removed by this projection. Before light is added back to such images, they are intrinsic images bearing reflectivity information only. Below we recover an approximate intrinsic RGB reflectivity, as in [8] but with a considerably less complex algorithm.

Clearly, if we calibrate a camera by determining the invariant 2-vector direction e then we know in advance that projecting in direction $e\perp$ produces the invariant image. To do so, we find the minimum-variance direction of mean-subtracted values $\rho$ for target colour patches [1]. However, if we have a single image, then we do not have the opportunity to calibrate. Nevertheless if we have an image with unknown source we would still like to be able to remove shadows from it. We show now that the automatic determination of the invariant direction is indeed possible, with entropy minimization being the correct mechanism.

Intrinsic Images by Entropy Minimization

Entropy Minimization

If we wished to find the minimum-variance direction for lines in FIG. 1, we would need to know which points fall on which lines. But what if we did not have that information? Entropy minimization is the key to finding the right invariant direction.

To test the idea that entropy minimization gives an intrinsic image, suppose we start with a theoretical Dirac-delta sensor camera, as in FIG. 3(b). Now let us synthesize an "image" that consists of many measured natural surface reflectance functions interacting with many lights, in turn, and then imaged by our theoretical camera. As a test, we use the reflectance data $S(\lambda)$ for 170 natural objects, measured by Vrhel et al. [9]. For lights, we use the 9 Planckian illuminants $E(\lambda)$ with T from 2,500° to 10,500° Kelvin with interval of 1,000°. Thus we have an image composed of 1,530 different illuminant-reflectance colour signal products.

If we form chromaticities (actually we use geometric mean chromaticities defined in eq. (7) below), then taking logarithms and plotting we have 9 points (for our 9 lights) for every colour patch. Subtracting the mean from each 9-point set, all lines go through the origin. Then it is trivial to find the best direction describing all 170 lines via applying the Singular Value Decomposition method to this data. The best direction line is found at angle 68.89°. And in fact we know from theory that this angle is correct, for this camera. This verifies the straight-line equation (6), in this situation where the camera and surfaces exactly obey our assumptions. This exercise amounts, then, to a calibration of our theoretical camera in terms of the invariant direction.

But now suppose we do not know that the best angle at which to project our theoretical data is orthogonal to about 69°—how can we recover this information? Clearly, in this theoretical situation, the intuition displayed in FIG. 1 can be brought into play by simply traversing all possible projection angles that produce a projection direction $e\perp$: the direction that generates an invariant image with minimum entropy is the correct angle.

To carry out such a comparison, we simply rotate from 0° to 180° and project the logchromaticity image 2-vector $\rho$ into that direction. A histogram is then formed (we used 64 equally-spaced bins). And finally the entropy is calculated: the histogram is divided by the sum of the bin counts to form probabilities $p_i$ and, for bins that are occupied, the sum of $-p_i \log_2 p_i$ is formed.

FIG. 3(c) shows a plot of angle versus this entropy measure, for the synthetic image. As can be seen, the correct angle of 159=90+69° is accurately determined (within a degree). FIG. 3(d) shows the actual "image" for these theoretical colour patches, given by exponentiating the projected log-image.

As we go from left to right across FIG. 3(d) we change reflectance. From top to bottom we have pixels calculated with respect to different lights. Because the figure shows the invariant image coded as a grey scale there is very little variation from top to bottom. Yet the greyscale value does change from left to right. So, in summary, FIG. 3(d) tells us that the same surface has the same invariant across lights but different surfaces have different invariants (and so the intrinsic image conveys useful reflectance information). Next, we consider an "image" formed from measured calibration values of a colour target, as in FIG. 2.

Calibration Images Versus Entropy Minimization

Now let us investigate how this theoretical method can be used for real, non-synthetic images. We already have acquired calibration images, such as FIG. 2(a), over 14 phases of daylight. These images are taken with an experimental HP 912 digital camera with the normal nonlinear processing software disabled.

Geometric Mean Invariant Image. From (4), we can remove $\sigma$ and I via division by any colour channel: but which channel should we use? If we divide by red, but red happens to be everywhere small, as in a photo of greenery, say, this is problematical. A better solution is to divide by the geometric mean [2], $\sqrt[3]{R \times G \times B}$. Then we still retain our straight line in log space, but do not favour one particular channel.

Thus we amend our definitions (5, 6) of chromaticity as follows:

$$c_k = R_k / \sqrt[3]{\Pi_{i=1}^3 R_i} \equiv R_k/R_M, \quad (7)$$

and log version [2]

$$\rho_k = \log(c_k) = \log(s_k/s_M) + (e_k - e_M)/T, \, k=1\ldots3, \text{ with}$$

$$s_k = k_1 \lambda_k^{-5} S(\lambda_k) q_k, s_M = \sqrt[3]{\Pi_{i=1}^3 s_j}, e_k = -k_2/\lambda_k, e_M = -k_2/3\Sigma_{j=1}^P \lambda_j, \quad (8)$$

and for the moment we carry all three (thus nonindependent) components of chromaticity. Broadband camera versions are stated in [2].

Geometric Mean 2-D Chromaticity Space. We should use a 2D chromaticity space that is appropriate for this color space r. We note that, in log space, r is orthogonal to $u=\sqrt{3}(1,1,1)^T$. I.e., r lives on a plane orthogonal to u, as in FIG. 4, r·u=0. The geometric mean divisor means that every r is orthogonal to u. Basis in plane is {c1, c2}. To characterize the 2D space, we can consider the projector P onto the plane.

$$P\frac{1}{u}$$

has two non-zero eigenvalues, so its decomposition reads $$P\frac{1}{u} = I - uu^T = U^T U, \quad (9)$$

where U is a 2×3 orthogonal matrix. U rotates 3-vectors $\rho$ into a coordinate system in the plane:

$$\chi = U\rho, \chi \text{ is } 2\times1. \quad (10)$$

Straight lines in $\rho$ are still straight in $\chi$.

In the {$\chi 1, \chi 2$} plane, we are now back to a situation similar to that in FIG. 1: we must find the correct direction $\theta$ in which to project, in the plane, such that the entropy for the marginal distribution along a 1D projection line orthogonal to the lighting direction is minimized. The greyscale image I along this line is formed via $$I = \chi_1 \cos \theta + \chi_2 \sin \theta \quad (11)$$

and the entropy is given by $$\eta = -\Sigma p_i(I) \log(p_i(I)). \quad (12)$$

Main Idea. Thus the heart of the method is as follows:

1. Form a 2D log-chromaticity representation of the image.

2. for $\theta = 1 \ldots 180$
   a) Form greyscale image I: the projection onto 1D direction.
   b) Calculate entropy.
   c) Min-entropy direction is correct projection for shadow removal.

3-Vector Representation. After we find q, we can go back to a 3-vector representation of points on the projection line via the 2×2 projector P q: we form the projected 2-vector c q via c q=P q c and then back to an estimate (indicated by a tilde) of 3D r and c via $\tilde{\rho} = U^T$ c q, $=\exp(\tilde{\rho})$. For display, we would like to move from an intrinsic image, governed by reflectivity, to one that includes illumination (cf. [4]). So we add back enough e so that the median of the brightest 1% of the pixels has the 2D chromaticity of the original image: c q→c extra light.

Entropy Minimization—Strong Indicator. From the calibration technique described above we in fact already know the correct characteristic direction in which to project to attenuate illumination effects: for the HP-912 camera, this angle turns out to be 158.5°. We find that entropy minimization gives a close approximation of this result: 161°.

First, transforming to 2D chromaticity coordinates $\chi$, the colour patches of the target do form a scatterplot with approximately parallel lines, in FIG. 5(a). We compose an "image" consisting of a montage of median pixels for all 24 colour patches and 14 lights. The calculation of entropy carried out for this image gives a very strong minimum, shown in FIG. 5(b), and excellent greyscale I invariant to lighting in FIG. 5(c).

We now examine the issues involved when we extend this theoretical success to the realm of real non-calibration images.

Intrinsic Image Recovery Algorithm

Algorithm Steps

Consider the colour image in FIG. 6(a): two people are illuminated from behind by strong sunlight. As well, there is a skylight illumination component that creates non-zero RGBs in the shadow region. Here, we have a calibrated camera, so we will know if entropy minimization produces the correct answer. To find the minimum entropy, we again examine projections I over angles 0° to 180°, for log-chromaticities $\chi$ formed according to eqs. (7), (8), and (10). For each angle, we project the log-chromaticity, and then determine the entropy (12). However, the nature of the data, for real images, presents an inherent problem. Since we are considering ratios, we can expect noise to possibly be enhanced (although this is mitigated by the sum in eq. (14)). To begin with, therefore, we apply Gaussian smoothing to the original image colour channels. But even so, we expect that some ratios may be large. So the question remains as to what we should use as the range, and number of bins, in a histogram of a projected greyscale image I.

To begin with, then, we can determine the range of invariant image greyscale values, for each candidate projection angle. FIG. 6(b) shows a plot of this range, in solid lines, versus projection angle. The figure also shows the range, dashed, of the 5-percentile and 95-percentile lines. We can see that the full range contains many outliers. Therefore it makes sense to exclude these outliers from consideration.

Hence we use the middle values only, i.e., the middle 90% of the data, to form a histogram. To form an appropriate bin width, we utilize Scott's Rule [10]:

$$\text{bin width}=3.5 \text{ std (projected data) } N^{1/3} \quad (13)$$

where N is the size of the invariant image data, for the current angle. Note that this size is different for each angle, since we exclude outliers differently for each projection.

The entropy calculated is shown in FIG. 7(a). The minimum entropy occurs at angle 156°. For the camera which captures the images, in fact we have calibration images using a Macbeth ColorChecker. From these, we determined that the correct invariant direction is actually 158.5°, so we have done quite well, without any calibration, by minimizing entropy instead. The figure shows that the minimum is a relatively strong dip, although not as strong as for the theoretical synthetic image.

Once we have an estimate of the geometric-mean chromaticity (7), we can also go over to the more familiar $L_1$-based chromaticity {r, g, b}, defined as $$r=\{r,g,b\}=\{R,G,B\}/(R+G+B), r+g+b=1. \quad (14)$$

This is the most familiar representation of colour independent of magnitude. Column 2 of (FIG. 8 shows the $L_1$ chromaticity for colour images.) To obtain $L_1$ chromaticity r from c, we simply take $$\tilde{r} = \tilde{c} \sum_{k=1}^{3} \tilde{c}_k \quad (15)$$

Since r is bounded ∈[0, 1], invariant images in r are better-behaved than is I. The greyscale image I for this test is shown in FIG. 7(b), and the L1 chromaticity version r, as per eq. (15), is shown in FIG. 7(c). (See http://www.cs.sfu.ca/~mark/ftp/Eccv04/ for a video of images as the projection angle changes, with shadows dissappearing.)

Using a re-integration method similar to that in [3], we can go on to recover a full-colour shadow-free image, as in FIG. 7(d). The method [3] uses a shadow-edge map, derived from comparing the original edges to those in the invariant image. Here we use edges from the invariant chromaticity image FIG. 7(c), and compare to edges from a Mean-Shift [11] processed original image. As well, rather than simply zeroing edges across the shadow edge, here we use a simple form of in-filling to grow edges into shadow-edge regions. Regaining a full-colour image has two components: finding a shadow-edge mask, and then re-integrating. The first step is carried out by comparing edges in the Mean-Shift processed original image with the corresponding recovered invariant chromaticity image. We look for pixels that have edge values higher than a threshold for any channel in the original, and lower than another threshold in the invariant, shadow-free chromaticity. We identify these as shadow edges, and then thicken them using a morphological operator. For the second stage, for each log colour channel, we first grow simple gradient-based edges across the shadow-edge mask using iterative dilation of the mask and replacement of unknown derivative values by the mean of known ones. Then we form a second derivative, go to Fourier space, divide by the Laplacian operator transform, and go back to x, y space. Neumann boundary conditions leave an additive constant unknown in each recovered log colour, so we regress on the top brightness quartile of pixel values to arrive at the final resulting colour planes.

Other images from the known camera show similar behaviour, usually with strong entropy minima, and shadow-free results very close to those in [3]. Minimum-entropy angles have values from 147° to 161° for the same camera, with 158.5° being correct. Both in terms of recovering the correct invariant direction and in terms of generating a good, shadow-free, invariant image, minimization of entropy leads to correct results.

Images from an Unknown Camera

FIG. 8 shows results from uncalibrated images, from a consumer HP618 camera. In every case tried, entropy minimization provides a strong guiding principle for removing shadows.

CONCLUSIONS

We have presented a method for finding the invariant direction, and thus a greyscale and thence an $L_1$-chromaticity intrinsic image that is free of shadows, without any need for a calibration step or special knowledge about an image. The method appears to work well, and leads to good re-integrated full-colour images with shadows greatly attenuated.

For the re-integration step, application of a curl-correction method to ensure integrability would be of benefit. Also, consideration of a separate shadow-edge map for x and y could be useful, since in principle these are different. A variational in-filling algorithm would work better than our present simple morphological edge-diffusion method for crossing shadow-edges, but would be slower.

Aspects of the present invention seek to automate processing of unsourced imagery such that shadows are removed. Results have indicated that, at the least, such processing can remove shadows and as well tends to "clean up" portraiture such that faces, for example, look more appealing after processing.

Thus methods and systems according to the present invention permit an intrinsic image to be found without calibration, even when nothing is known about the image.

It will be understood that the above description of the present invention is susceptible to various modification, changes and adaptations.

REFERENCES

1. G. D. Finlayson and S. D. Hordley. Color constancy at a pixel. *J. Opt. Soc. Am. A*, 18(2):253-264, February 2001. Also, UK Patent #2360660, "Colour signal processing which removes illuminant colour temperature dependency".
2. G. D. Finlayson and M. S. Drew. 4-sensor camera calibration for image representation invariant to shading, shadows, lighting, and specularities. In *ICCV'01: International Conference on Computer Vision*, pages II: 473-480. IEEE, 2001.
3. G. D. Finlayson, S. D. Hordley, and M. S. Drew. Removing shadows from images. In *ECCV 2002: European Conference on Computer Vision*, pages 4:823-836, 2002. Lecture Notes in Computer Science Vol. 2353, http://www.cs.sfu.ca/~mark/ftp/Eccv02/shadowless.pdf.
4. M. S. Drew, G. D. Finlayson, and S. D. Hordley. Recovery of chromaticity image free from shadows via illumination invariance. In *IEEE Workshop on Color and Photometric Methods in Computer Vision, ICCV'03*, pages 32-39, 2003. http://www.cs.sfu.ca/~mark/ftp/Iccv03ColorWkshp/iccv03wkshp.pdf.

5. H. Jiang and M. S. Drew. Shadow-resistant tracking in video. In *ICME'03: Intl. Conf. on Multimedia and Expo*, pages III 77-80, 2003. http://www.cs.sfu.ca/~mark/ftp/Icme03/icme03.pdf.
6. G. D. Finlayson, M. S. Drew, and B. V. Funt. Spectral sharpening: sensor transformations for improved color constancy. *J. Opt. Soc. Am. A*, 11(5):1553-1563, May 1994.
7. G. Wyszecki and W. S. Stiles. *Color Science: Concepts and Methods, Quantitative Data and Formulas*. Wiley, New York, 2nd edition, 1982.
8. M. F. Tappen, W. T. Freeman, and E. H. Adelson. Recovering intrinsic images from a single image. In *Advances in Neural Information Processing Systems* 15. MIT Press, 2003.
9. M. J. Vrhel, R. Gershon, and L. S. Iwan. Measurement and analysis of object reflectance spectra. *Color Research and Application*, 19:4-9, 1994.
10. D. W. Scott. *Multivariate Density Estimation: Theory, Practice and Visualization*. Wiley and Kegan Paul, 1992.
11. D. Comaniciu and P. Meer. Mean shift: A robust approach toward feature space analysis. *PAMI*, 24:603-619, 2002.
12. B. V. Funt, M. S. Drew, and M. Brockington. Recovering shading from color images. In G. Sandini, editor, *ECCV-92: Second European Conference on Computer Vision*, pages 124-132. Springer-Verlag, May 1992.
13. G. D. Finlayson, M. S. Drew, and C. Lu. Intrinsic Images by Entropy Minimization. In T. Pajdla and J. Matas, editors, Computer Vision—ECCV 2004: 8th European Conference on Computer Vision, pages. 582-595, Springer-Verlag, Apr. 21, 2004. (The contents of the present document are in large part based on this paper, which is incorporated by reference herein.)

What is claimed is:

1. A method for recovery of an invariant image from an original image, the method including the steps of:
    a. generating a representation of the original image in log-chromaticity space;
    b. determining an angle of an invariant direction in the log-chromaticity space by minimizing entropy in the representation, and
    c. generating the invariant image in accordance with the angle of the invariant direction.

2. A method according to claim 1 wherein the original image is a 3-band color image.

3. A method according to claim 1, comprising the steps of:
    a. imaging a scene under a single illuminant to generate the original image,
    b. forming the log-chromaticity image 2-vector $\rho$,
    c. projecting said vector into a direction corresponding to each of a plurality of angles,
    d. forming a histogram,
    e. calculating the entropy, and
    f. identifying the angle corresponding to minimum entropy.

4. A method according to claim 3, wherein the entropy is calculated from the histogram by forming probabilities $p_i$ and forming the sum of $-p_i \log 2 p_i$.

5. A method according to claim 1 wherein the original image is a 3-band color camera image defined by a set of pixels.

6. A method according to claim 1 further comprising the step of displaying the invariant image.

7. A method for recovery of an invariant image from an original image, the method including the steps of:
    a. forming a 2D log-chromaticity representation of the original image;
    b. for each of a plurality of angles, forming as a grey scale image the projection onto a 1D direction and calculating the entropy; and
    c. selecting the angle corresponding to the minimum entropy as the correct projection recovering the invariant image, and
    d. generating the invariant image in accordance with the angle of minimum entropy.

8. A method according to claim 7 wherein the original image is a 3-band color image.

9. A method according to claim 7 wherein the original image is a 3-band color camera image defined by a set of pixels.

10. A method according to claim 7 further comprising the step of displaying the invariant image.

11. A system for handling images comprising:
    a. means for imaging a scene under a single illuminant,
    b. means for forming the log-chromaticity image 2-vector $\rho$,
    c. means for projecting said vector into a direction corresponding to each of a plurality of angles,
    d. means for forming a histogram,
    e. means for calculating the entropy,
    f. means for identifying the angle corresponding to minimum entropy, and
    g. means for generating an invariant image corresponding to the identified angle.

* * * * *